(12) United States Patent
Curie et al.

(10) Patent No.: US 11,550,602 B2
(45) Date of Patent: Jan. 10, 2023

(54) REAL-TIME INTERFACE CLASSIFICATION IN AN APPLICATION

(71) Applicant: Klarna Bank AB, Stockholm (SE)

(72) Inventors: Vladimir Curie, Uppsala (SE); James W. Barrett, Stockholm (SE); Andrey Melentyev, Stockholm (SE); Melody Ju, Stockholm (SE)

(73) Assignee: Klarna Bank AB, Stockholm (SE)

( * ) Notice: Subject to any disclaimer, the term of this patent is extended or adjusted under 35 U.S.C. 154(b) by 0 days.

(21) Appl. No.: 17/101,744

(22) Filed: Nov. 23, 2020

(65) Prior Publication Data

US 2021/0279081 A1     Sep. 9, 2021

Related U.S. Application Data

(63) Continuation of application No. 16/813,531, filed on Mar. 9, 2020, now Pat. No. 10,846,106.

(51) Int. Cl.
*G06F 9/451* (2018.01)
*G06F 8/38* (2018.01)
(Continued)

(52) U.S. Cl.
CPC .............. *G06F 9/451* (2018.02); *G06F 8/38* (2013.01); *G06K 9/6223* (2013.01); *G06N 20/00* (2019.01)

(58) Field of Classification Search
CPC ........... G06F 9/451; G06F 8/38; G06N 20/00; G06K 9/6223
(Continued)

(56) References Cited

U.S. PATENT DOCUMENTS 6,073,163 A     6/2000 Clark et al.
6,346,953 B1    2/2002 Erlikh et al.
(Continued)

FOREIGN PATENT DOCUMENTS

CN      105955889 A    9/2016
CN      112287273 A    1/2021
(Continued)

OTHER PUBLICATIONS

Amazon Web Services, "AWS KMS keys concepts," AWS Key Management Service Developer Guide, first disclosed Nov. 12, 2014, latest update Aug. 30, 2021, https://docs.aws.amazon.com/kms/latest/developerguide/concepts.html, 21 pages.
(Continued)

*Primary Examiner* — William D Titcomb
(74) *Attorney, Agent, or Firm* — Davis Wright Tremaine LLP

(57) ABSTRACT

Integration code usable to cause a computing device to determine which category from a plurality of categories corresponds to an interface of an interface provider is generated based at least in part on output from a machine learning algorithm trained to categorize interfaces. The computing device is caused, by providing the integration code to the computing device, to execute the integration code to cause the computing device to evaluate characteristics of an interface of an interface provider, determine a category of an interface of the interface provider, and interact with the interface in a manner that accords with the category.

20 Claims, 9 Drawing Sheets

(51) Int. Cl.
*G06K 9/62* (2022.01)
*G06N 20/00* (2019.01)

(58) Field of Classification Search
USPC .......................................................... 715/762
See application file for complete search history.

(56) References Cited

U.S. PATENT DOCUMENTS

| | | | |
|---|---|---|---|
| 7,788,590 B2* | 8/2010 | Taboada | G06F 9/451 |
| | | | 715/236 |
| 8,396,903 B2 | 3/2013 | Jellum et al. | |
| 8,775,923 B1 | 7/2014 | Kroeger et al. | |
| 8,812,546 B1 | 8/2014 | Cornali | |
| 8,886,669 B2 | 11/2014 | Limber et al. | |
| 9,252,962 B1 | 2/2016 | Valeti | |
| 9,600,401 B1 | 3/2017 | Haischt et al. | |
| 9,753,898 B1 | 9/2017 | Glommen et al. | |
| 9,836,781 B2 | 12/2017 | Potucek et al. | |
| 9,946,895 B1 | 4/2018 | Kruse et al. | |
| 9,959,027 B1 | 5/2018 | Gajulapally et al. | |
| 10,043,255 B1* | 8/2018 | Pathapati | G06N 20/00 |
| 10,121,176 B2 | 11/2018 | Buezas et al. | |
| 10,152,552 B2 | 12/2018 | Simpson et al. | |
| 10,649,864 B1 | 5/2020 | Parikh et al. | |
| 10,748,035 B2 | 8/2020 | Lee | |
| 10,816,978 B1 | 10/2020 | Schwalb | |
| 2002/0063734 A1 | 5/2002 | Khalfay et al. | |
| 2004/0216044 A1 | 10/2004 | Martin et al. | |
| 2006/0101392 A1 | 5/2006 | Isaza | |
| 2007/0073758 A1 | 3/2007 | Perry et al. | |
| 2007/0132779 A1 | 6/2007 | Gilbert et al. | |
| 2007/0300145 A1 | 12/2007 | Perelman et al. | |
| 2009/0193250 A1 | 7/2009 | Yokota et al. | |
| 2009/0319342 A1 | 12/2009 | Shilman et al. | |
| 2010/0175050 A1 | 7/2010 | Wang et al. | |
| 2010/0191582 A1 | 7/2010 | Dicker et al. | |
| 2010/0306249 A1 | 12/2010 | Hill et al. | |
| 2011/0106732 A1 | 5/2011 | Chidlovskii | |
| 2011/0126158 A1 | 5/2011 | Fogarty et al. | |
| 2011/0289489 A1 | 11/2011 | Kumar et al. | |
| 2011/0302487 A1* | 12/2011 | McCormack | G06Q 30/02 |
| | | | 715/239 |
| 2012/0084770 A1 | 4/2012 | Kriebel et al. | |
| 2012/0089933 A1 | 4/2012 | Garand et al. | |
| 2012/0131456 A1 | 5/2012 | Lin et al. | |
| 2012/0174069 A1 | 7/2012 | Zavatone | |
| 2012/0290428 A1 | 11/2012 | Ben-Bassat et al. | |
| 2013/0095864 A1 | 4/2013 | Marovets | |
| 2014/0173415 A1 | 6/2014 | Kattil Cherian et al. | |
| 2014/0222616 A1 | 8/2014 | Siemiatkowski et al. | |
| 2014/0372867 A1 | 12/2014 | Tidhar et al. | |
| 2015/0082280 A1* | 3/2015 | Betak | G06F 11/3688 |
| | | | 717/124 |
| 2015/0088650 A1 | 3/2015 | Taylor et al. | |
| 2015/0113477 A1 | 4/2015 | Haussila et al. | |
| 2015/0154012 A1* | 6/2015 | Wolfram | G06F 40/174 |
| | | | 717/176 |
| 2015/0264107 A1 | 9/2015 | Harz et al. | |
| 2015/0278779 A1 | 10/2015 | Pfeifer | |
| 2015/0287046 A1 | 10/2015 | Richards et al. | |
| 2016/0065370 A1 | 3/2016 | Le Saint et al. | |
| 2016/0080157 A1 | 3/2016 | Lundstrom | |
| 2016/0092499 A1* | 3/2016 | Leigh | G06F 8/34 |
| | | | 707/740 |
| 2016/0125371 A1 | 5/2016 | Grassadonia et al. | |
| 2016/0155165 A1 | 6/2016 | Babar et al. | |
| 2016/0180318 A1 | 6/2016 | Brooks | |
| 2016/0188145 A1 | 6/2016 | Vida et al. | |
| 2016/0239870 A1 | 8/2016 | Mishra et al. | |
| 2016/0328984 A1 | 11/2016 | Ben-Naim | |
| 2016/0370956 A1 | 12/2016 | Penha et al. | |
| 2016/0379220 A1 | 12/2016 | Tunnell et al. | |
| 2017/0006135 A1* | 1/2017 | Siebel | H04L 67/12 |
| 2017/0011441 A1 | 1/2017 | Buezas et al. | |
| 2017/0024721 A1 | 1/2017 | Joson et al. | |
| 2017/0038846 A1* | 2/2017 | Minnen | G06V 40/28 |
| 2017/0090690 A1 | 3/2017 | Chor | |
| 2017/0124053 A1 | 5/2017 | Campbell et al. | |
| 2017/0161822 A1 | 6/2017 | Crogan et al. | |
| 2017/0168996 A1 | 6/2017 | Dou et al. | |
| 2017/0277374 A1 | 9/2017 | Ozcan et al. | |
| 2017/0337116 A1 | 11/2017 | Negara et al. | |
| 2017/0353422 A1 | 12/2017 | Ghosh et al. | |
| 2017/0372408 A1 | 12/2017 | Khandelwal et al. | |
| 2018/0024915 A1 | 1/2018 | Taneja | |
| 2018/0047038 A1 | 2/2018 | DeLuca et al. | |
| 2018/0157994 A1* | 6/2018 | Levy | G06F 30/20 |
| 2018/0158037 A1 | 6/2018 | Cassel et al. | |
| 2018/0174212 A1 | 6/2018 | Lauka et al. | |
| 2018/0210428 A1 | 7/2018 | Jundt et al. | |
| 2018/0335939 A1 | 11/2018 | Karunamuni et al. | |
| 2018/0336574 A1 | 11/2018 | Mohan et al. | |
| 2018/0350144 A1 | 12/2018 | Rathod | |
| 2018/0357729 A1 | 12/2018 | Farnham et al. | |
| 2019/0007508 A1 | 1/2019 | Xu et al. | |
| 2019/0114059 A1 | 4/2019 | Chakra et al. | |
| 2019/0114061 A1 | 4/2019 | Daniels et al. | |
| 2019/0114485 A1* | 4/2019 | Chan | G11B 27/031 |
| 2019/0129732 A1* | 5/2019 | Sivertson | G06N 7/005 |
| 2019/0158994 A1 | 5/2019 | Gross et al. | |
| 2019/0205773 A1 | 7/2019 | Ackerman et al. | |
| 2019/0259293 A1* | 8/2019 | Hellman | G06F 9/451 |
| 2019/0272540 A1 | 9/2019 | Wells et al. | |
| 2019/0294642 A1 | 9/2019 | Matlick et al. | |
| 2019/0384699 A1 | 12/2019 | Arbon et al. | |
| 2020/0007487 A1 | 1/2020 | Chao et al. | |
| 2020/0034160 A1* | 1/2020 | Koren | H04L 67/10 |
| 2020/0074448 A1 | 3/2020 | Isaacson et al. | |
| 2020/0089813 A1 | 3/2020 | Chauhan | |
| 2020/0089912 A1 | 3/2020 | Mital et al. | |
| 2020/0125635 A1* | 4/2020 | Nuolf | G06N 5/04 |
| 2020/0134388 A1 | 4/2020 | Rohde | |
| 2020/0167420 A1* | 5/2020 | Yin | G06F 40/30 |
| 2020/0201689 A1* | 6/2020 | Laethem | G06F 9/543 |
| 2020/0242669 A1 | 7/2020 | Carroll et al. | |
| 2020/0306959 A1 | 10/2020 | Huang et al. | |
| 2020/0394396 A1 | 12/2020 | Yanamandra et al. | |
| 2020/0396304 A1 | 12/2020 | Webber et al. | |
| 2020/0409668 A1 | 12/2020 | Eberlein et al. | |
| 2020/0410062 A1 | 12/2020 | O'Malley | |
| 2020/0410063 A1 | 12/2020 | O'Malley | |
| 2021/0044491 A1 | 2/2021 | Shah et al. | |
| 2021/0090449 A1 | 3/2021 | Smith et al. | |
| 2021/0117868 A1* | 4/2021 | Sriharsha | G06F 16/2246 |
| 2021/0267688 A1 | 9/2021 | Quiros et al. | |
| 2021/0287130 A1 | 9/2021 | Kalluri | |

FOREIGN PATENT DOCUMENTS

| | | |
|---|---|---|
| WO | 2014204862 A1 | 12/2014 |
| WO | 2018053863 A1 | 3/2018 |
| WO | 2019171163 A1 | 9/2019 |
| WO | 2020069387 A1 | 4/2020 |

OTHER PUBLICATIONS

Gur et al., "Adversarial Environment Generation for Learning to Navigate the Web," Deep RL Workshop, NeurIPS 2020, Mar. 2, 2021, 14 pages.
Gur et al., "Learning to Navigate the Web," International Conference on Learning Representations (ICLR) 2019, Dec. 21, 2018, 12 pages.
Hou et al., "Malicious web content detection by machine learning," Expert Systems With Applications 37(1):55-60, Jan. 1, 2010.
International Search Report and Written Opinion dated Apr. 6, 2021, Patent Application No. PCT/IB2021/050169, 15 pages.
International Search Report and Written Opinion dated Feb. 16, 2021, Patent Application No. PCT/IB2020/060585, 16 pages.
International Search Report and Written Opinion dated Jun. 9, 2021, Patent Application No. PCT/IB2021/052415, 15 pages.

(56) References Cited

OTHER PUBLICATIONS

International Search Report and Written Opinion dated May 25, 2021, Patent Application No. PCT/IB2021/051913, 13 pages.

ip.com, "Method and system for using data analytics to leverage consumer purchasing patterns to support charity organizations," IP.com, Sep. 11, 2014, Prior Art Database Technical Disclosure, IP.com No. PCOM000238684D, 4 pages.

Memon et al., "GUI Ripping: Reverse Engineering of Graphical User Interfaces for Testing," Proceedings of the 10th Working Conference on Reverse Engineering (WCRE '03), Nov. 2003, 10 pages.

Nasraoui et al., "Human-Algorithm Interaction Biases in the Big Data Cycle: A Markov Chain Iterated Learning Framework," arXiv preprint arXiv: 1608.07895, Aug. 29, 2016, 9 pages.

Second Written Opinion of the International Preliminary Examining Authority dated Oct. 26, 2021, Patent Application No. PCT/IB2020/060585, 9 pages.

Wikipedia, "k-means clustering," Wikipedia the Free Encyclopedia, last edited Jun. 25, 2020 (retrieved Jul. 9, 2020), https://en.wikipedia.org/wiki/k-means_clustering, 16 pages.

Wikipedia, "MHTML," Wikipedia the Free Encyclopedia, last edited Apr. 29, 2021, https://en.wikipedia.org/wiki/MHTML, 6 pages.

Wikipedia, "X.509," Wikipedia Encyclopedia, Aug. 16, 2018, retrieved May 13, 2020, from https://web.archive.org/web/20180816222554/https://en.wikipedia.org/wiki/X.509, 16 pages.

Hald et al., "Procedural Content Generation of Puzzle Games using Conditional Generative Adversarial Networks," Malta '20: 11th Workshop On Procedural Content Generation (PCG 2020), Sep. 15-18, 2020, 14 pages.

Liu et al., "Deep Learning for Procedural Content Generation," Oct. 9, 2020, 22 pages.

Torrado et al., "Bootstrapping Conditional GANs for Video Game Level Generation," Oct. 3, 2019, 8 pages.

\* cited by examiner

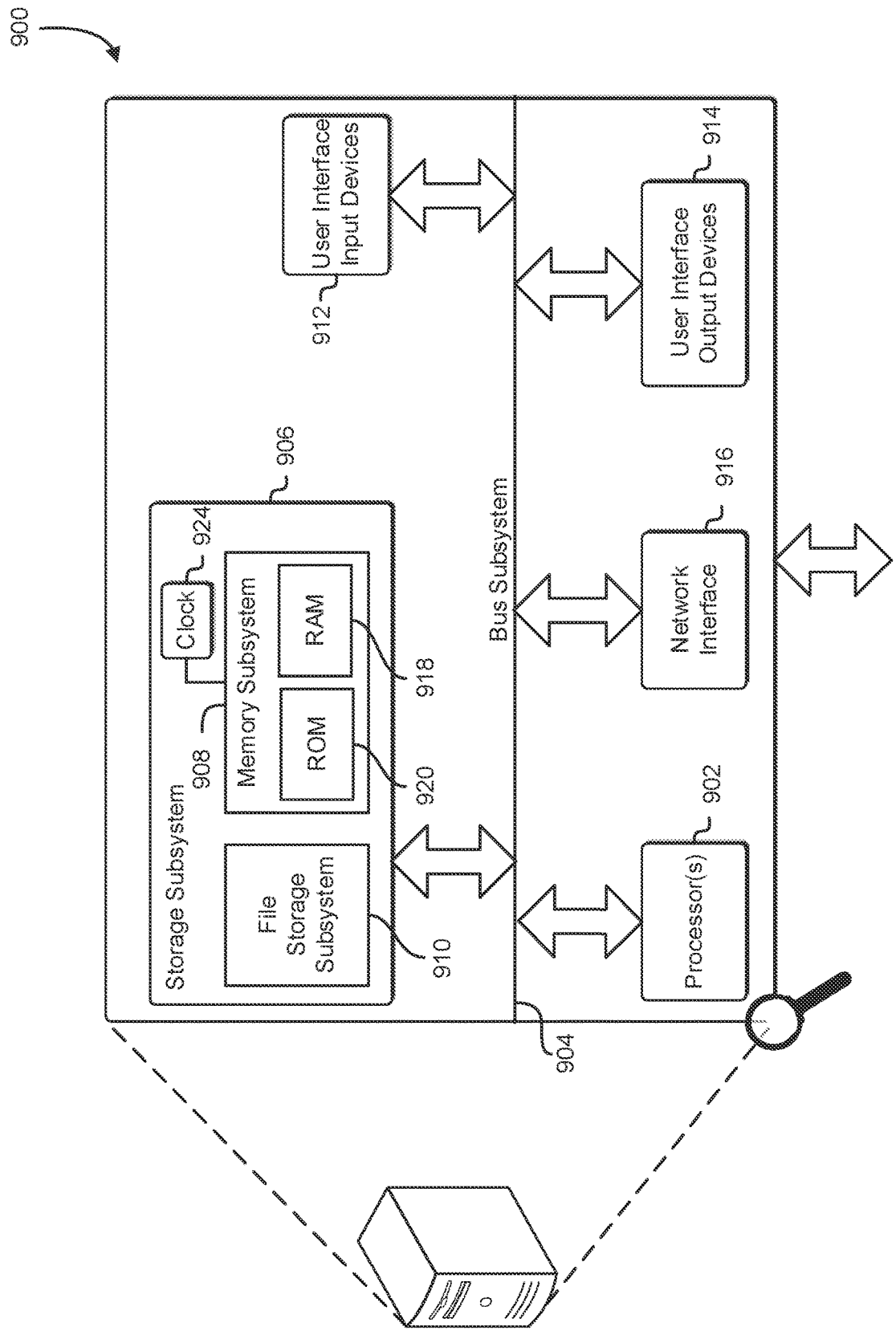

REAL-TIME INTERFACE CLASSIFICATION IN AN APPLICATION

CROSS-REFERENCE TO RELATED APPLICATIONS

This application is a continuation of U.S. patent application Ser. No. 16/813,531, filed Mar. 9, 2020 entitled "REAL-TIME INTERFACE CLASSIFICATION IN AN APPLICATION" the contents of which is incorporated by reference herein in its entirety.

This application also incorporates by reference for all purposes the full disclosure of co-pending U.S. patent application Ser. No. 16/680,392, filed Nov. 11, 2019, entitled "DYNAMIC LOCATION AND EXTRACTION OF A USER INTERFACE ELEMENT STATE IN A USER INTERFACE THAT IS DEPENDENT ON AN EVENT OCCURRENCE IN A DIFFERENT USER INTERFACE," U.S. patent application Ser. No. 16/680,396, filed Nov. 11, 2019, entitled "UNSUPERVISED LOCATION AND EXTRACTION OF OPTION ELEMENTS IN A USER INTERFACE," U.S. patent application Ser. No. 16/680,403, filed Nov. 11, 2019, entitled "DYNAMIC IDENTIFICATION OF USER INTERFACE ELEMENTS THROUGH UNSUPERVISED EXPLORATION," U.S. patent application Ser. No. 16/680,406, filed Nov. 11, 2019, entitled "LOCATION AND EXTRACTION OF ITEM ELEMENTS IN A USER INTERFACE," U.S. patent application Ser. No. 16/680,408, filed Nov. 11, 2019, entitled "UNSUPERVISED LOCATION AND EXTRACTION OF QUANTITY AND UNIT VALUE ELEMENTS IN A USER INTERFACE," U.S. patent application Ser. No. 16/680,410, filed Nov. 11, 2019, entitled "EXTRACTION AND RESTORATION OF OPTION SELECTIONS IN A USER INTERFACE," U.S. patent application Ser. No. 16/744,017, filed Jan. 15, 2020, entitled "INTERFACE CLASSIFICATION SYSTEM," and U.S. patent application Ser. No. 16/744,021, filed Jan. 15, 2020, entitled "METHOD OF TRAINING A LEARNING SYSTEM TO CLASSIFY INTERFACES.".

BACKGROUND

In some cases, an application developer may wish to design an application that interacts with one or more interfaces of various service providers. Complicating this aim, however, is that there are numerous types of interfaces serving various purposes with a variety of characteristics and functionality, and some types of interactions are not always possible with all types of interfaces. However, classifying a particular interface in order to determine which types of interactions can be used in the particular interface is complicated, and many users do not have available time or possess devices with large amounts of resources to perform complex interface classification processes and algorithms. Consequently, classifying the interfaces provided by any of a multitude of service providers accurately and in real-time is challenging due to the variations between different interfaces of the service providers.

BRIEF DESCRIPTION OF THE DRAWINGS

Various techniques will be described with reference to the drawings, in which:

FIG. 9 illustrates a computing device that may be used in accordance with at least one embodiment/an environment in which various embodiments can be implemented.

DETAILED DESCRIPTION

Figure 1:
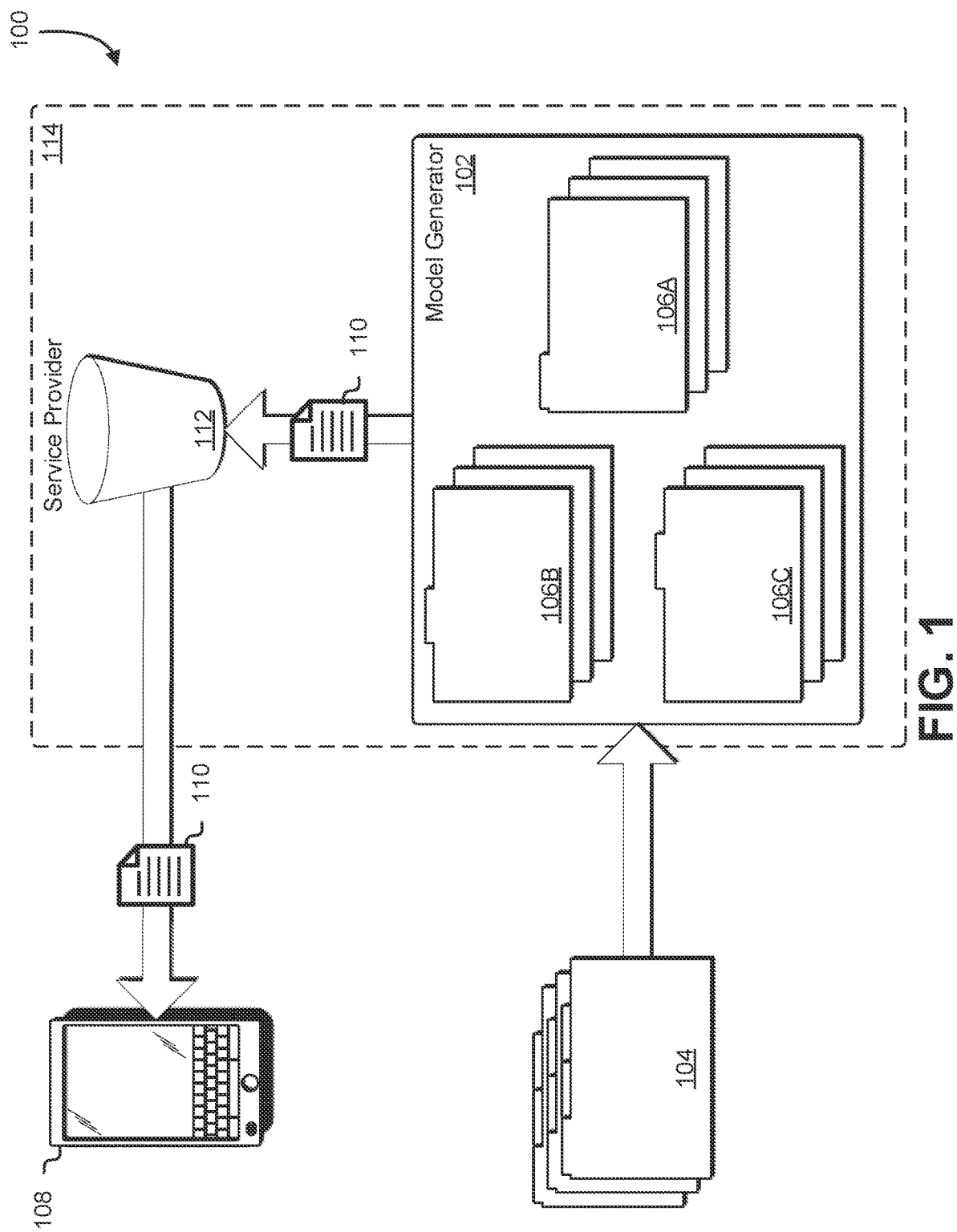
FIG. 1 illustrates an example of a machine learning model generator for classifying interfaces in accordance with an embodiment.

Techniques and systems described below relate to generating integration code that enables a computing device to dynamically determine a type of a given interface so that a software application running on the computing device can perform operations to the interface that are specific to the particular type of interface. In one example, a system obtains a plurality of interfaces of an interface provider, in which each of the plurality of interfaces may be associated with one of a plurality of interface categories. Each interface of the plurality of interfaces may be classified by an interface category of the plurality of interface categories. In some examples, the interface provider may provide various services that may be accessible through the plurality of interfaces. The plurality of interfaces may be interfaces such as webpages, and may be accessible through the Internet. In various examples, an interface category may refer to a classification or a type of an interface, such as a home page, an item page, a catalog page, and the like. The plurality of interfaces may comprise interfaces of various types or categories.

The system may, for each interface of the plurality of interfaces, extract a set of characteristic values from an object model of the interface and train a machine learning algorithm to determine interface categories using the set of characteristic values in conjunction with an interface category of the interface as a ground truth value. In various examples, the interface is a webpage, and the set of characteristic values may be extracted from a document object model (DOM) of the webpage. The set of characteristic values may be values that correspond to one or more characteristics of the interface. A set of characteristic values may be extracted for each interface of the plurality of interfaces, and the extracted sets of characteristic values may be compared with each other. In some examples, the extracted sets of characteristic values are grouped into interface categories as part of training the machine learning algorithm. The system may analyze and perform various calculations in connection with the grouped sets of characteristic values such that the machine learning algorithm may be trained to identify the category of a given interface based on a set of characteristic values extracted from the given interface.

The system may receive, from a client device, a request for integration code corresponding to the interface provider. The client device may access an interface provided by the interface provider, and may seek to determine a classification or type of the interface. The client device may submit a request to the system that may indicate that the client device has encountered an unknown interface provided by the interface provider. The client device may utilize various other interfaces and applications that may be provided by the system to submit the request. In some examples, the request is submitted from a software application executing on the client device.

The system may generate, based on the machine learning algorithm, the integration code. In various examples, the integration code is executable code that may utilize various aspects of the machine learning algorithm to determine the type or classification of a given interface. The integration code, upon execution by the client device, may cause the client device to evaluate characteristics (also referred to herein as "features") of the interface of the interface provider and determine which category from the plurality of interface categories corresponds to the interface. The system may then cause, by providing the integration code to the client device, the client device to determine the category of the interface of the interface provider and interact with the interface in a manner that accords with the interface category. The client device may execute the integration code to determine the category of the interface. The client device may then perform various processes that may be specific to the category of the interface in connection with the interface.

In an illustrative example of a use case that uses the techniques described in the present disclosure, the above mentioned interface provider may be a library organization of many library organizations that utilize one or more interfaces that users may interact with to access the services of the library organization. A system of the present disclosure may analyze the interfaces provided by the library organization to determine a machine learning algorithm that may be utilized to, for an interface provided by the library organization, identify the type or category of the interface (e.g., home page, item page, settings page, queue page, loading page, and/or variations thereof). The system may determine executable integration code from the machine learning algorithm that may, upon execution in connection with an interface provided by the library organization, identify the type or category of the interface. A customer of the library organization may encounter an interface provided by the library organization. The customer may want to determine the type of the interface; the customer may submit a request to the system for the integration code, and execute the integration code in connection with the interface to determine the type of the interface. The customer may then perform various operations in connection with the interface that may be specific to the type of the interface.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, especially the field of software development, by enabling software agents and other software or hardware tools to identify a particular type of interface to then determine how it can be interacted with. Additionally, techniques described and suggested in the present disclosure improve the speed and accuracy of systems that identify/determine interface types using machine learning algorithms and models as described in the present disclosure. Moreover, techniques described and suggested in the present disclosure are necessarily rooted in computer technology in order to overcome problems specifically arising with being able to automate human interaction with interfaces.

FIG. 1 illustrates an example 100 of a machine learning model generator for classifying interfaces, according to various embodiments. As illustrated in FIG. 1, the example 100 may include a service provider 114, which may comprise a machine learning model generator 102 that may generate a set of categorized interfaces 106C-06A from a set of training interfaces 104 to generate integration code 110. The integration code 110 may be stored in a data store 112 and thereafter may be utilized by a client device 108. In various examples, the client device 108 may cause the service provider 114 (e.g., in response to a request by the client device 108 for the integration code 110) to perform various processes to provide the integration code 110 to the client device 108.

The service provider 114 may be a provider of various computing services or applications to its users. In the example 100, the service provider implements the machine learning model generator 102 (e.g., on one or more application servers) that generates and provides various sets of integration code, in response to requests, as described in the present disclosure. In various examples, integration code refers to executable code executable by computing devices to perform various processes. In some examples, integration code is utilized by a device accessing an interface to determine a category or type of the interface. In the present disclosure, an interface may alternatively be referred to as an interface page, a user interface, and/or variations thereof. In some examples, the type or category of an interface may indicate the usage or intended function of the interface. In some examples, the type or category of an interface may refer to a classification of the interface. The classification may indicate the functionality, one or more characteristics, one or more use cases, and/or variations thereof, of the interface. Types of interface pages may include home pages, collection pages, item pages, search pages, queue pages, profile pages, setting pages, loading pages, form pages, and/or variations thereof. Although the present disclosure may refer to various particular types of interfaces for ease of illustration, it should be noted that, techniques described in the present disclosure may be operable to classify any number of types of different interface pages.

As noted, the service provider 114 may have one or more servers hosting the machine learning model generator 102 as well as various data stores such as the data store 112. In some examples, the service provider 114 implements software applications on at least one computing device, such as the computing device 900 of FIG. 9, to provide one or more services. Examples of such a computing device include one or more instances of a physical computing instance (e.g., a physical server computer, a mobile communication device, a laptop computer, a tablet computer, a personal computer, a mainframe, etc.) or one or more instances of a virtual computing instance, such as a virtual machine hosted on one or more computer servers, or other computing system capable of communicating with various systems and/or services.

In an embodiment, the machine learning model generator 102 is a software application or service of a service provider that executes to access various systems and/or services as needed to perform its functions described below. The machine learning model generator 102 may be implemented as software, hardware, and/or variations thereof. The machine learning model generator 102 may comprise one or more neural networks and/or machine learning algorithms that may be configured to interact with various interfaces (e.g., the set of training interfaces 104) and generate various models based at least on the various interfaces as well as objects and/or elements within the various interfaces. The machine learning model generator 102 may interact with various interfaces, such as Internet webpages (e.g., markup language interfaces), computing applications, computing services, mobile devices, and/or variations thereof. The machine learning model generator 102 may obtain the set of training interfaces 104. In some examples, the set of training interfaces 104 may be provided to the machine learning model generator 102 by the service provider 114. In various examples, the set of training interfaces 104 may be obtained by the machine learning model generator 102 through one or more communication networks, such as the Internet. The machine learning model generator 102 may obtain the set of training interfaces 104 by utilizing one or more uniform resource identifiers (URIs) that may be executed to identify interfaces of the set of training interfaces 104.

The set of training interfaces 104 may be a set of interfaces provided by an interface provider, a service provider, or some other entity. The term "training" here is not to suggest that the interfaces are designed for training purposes, but rather that they may be actual interfaces provided by interface providers that are being used by the service provider 114 to train a machine learning algorithm. The set of training interfaces 104 may be provided by an interface provider that provides various services such as data processing, data storage, software applications, security, encryption, library services, utility services, television services, entertainment services and/or other such services. The set of training interfaces 104 may be interfaces provided by an interface provider that allow an entity to access one or more services associated with the interface provider. The set of training interfaces 104 may also be a set of webpages accessible through one or more communication networks such as the Internet. The set of training interfaces 104 may be of various types, such as two or more of home pages, item pages, collection pages, queue pages, search pages, profile pages, media player pages, news feed pages, blog pages, and so on. It should be noted that, in various embodiments, each of the sets of training interfaces 104 can be any of a variety of types of interfaces, such as a graphical user interface or other type of interface provided to a user for interaction utilizing interface objects and/or elements. In an embodiment, the set of training interfaces 104 is associated with a specific interface provider, and comprise ground truth information indicating the type of each interface of the set of training interfaces 104. The set of training interfaces 104 may be provided by the specific interface provider, and the ground truth information (e.g., the interface classification) may be determined by the service provider 114, the specific interface provider, or some other third-party entity.

The machine learning model generator 102 may obtain the set of training interfaces 104 and generate characteristic vectors based on characteristics of the set of training interfaces 104. In some examples, a characteristic vector may refer to a vector that may represent one or more characteristics or objects of an interface, such as a position of an image in the interface, or a depth of a DOM tree of the interface. In various examples, a characteristic vector generated from an interface may be generated from various attributes or characteristics of an object model of the interface. In some examples, an object model may be a data representation or model of a hierarchical tree structure of components and properties of a given interface window or webpage displayed in a web browser. An interface may be represented by an object model that may be structured in a hierarchical format, in which elements/objects of the interface may be identified according to various attributes, functions, namespaces, values, and/or variations thereof. An interface may also be implemented from source code of the interface, which may be written in one or more computer languages (e.g., Hypertext Markup Language (HTML), Cascading Style Sheets (CSS), JavaScript, etc.) to represent the various elements/objects of the interface; a characteristic vector generated from the interface may also be generated from one or more attributes of the source code of the interface.

The characteristic vectors generated from the interfaces of the set of training interfaces 104 may all be generated in the same manner based on the same particular characteristics. For example, it may be determined, for a set of interfaces, a characteristic vector for a particular interface may be generated based on a dimension of a largest image that may be present in the particular interface. Continuing with the example, an interface of the set of interfaces may comprise a single image, in which a characteristic vector generated from the interface may comprise the dimensions of the single image. Further continuing with the example, a first interface of the set of interfaces may comprise a first image and a second image that may be larger than the first image, in which a characteristic vector generated from the first interface may comprise the dimensions of the second image. Further continuing with the example, a second interface of the set of interfaces may comprise no images, in which a characteristic vector generated from the second interface may be an empty vector. It should be noted that, in various embodiments, a characteristic vector generated from an interface is generated based on any characteristics, data objects, objects, information, and/or variations thereof, that may be associated with the interface.

The service provider 114 may have already classified or otherwise categorized the set of training interfaces 104 into the sets of categorized interfaces 106C-06A. The machine learning model generator 102 may utilize the ground truth information included with the set of training interfaces 104 to categorize the set of training interfaces 104 into the sets of categorized interfaces 106C-06A. For purposes of illustration, the example depicts the sets of categorized interfaces 106C-06A being categorized into three types: a set of interfaces of a first type 106C, a set of interfaces of a second type 106B, and a set of interfaces of a third type 106A. Although FIG. 1 depicts three categories of interfaces, it is contemplated that there may be any number of interface categories depending on implementation of the techniques of the present disclosure. For example, a simple two-category system may be interfaces classified as "item interface types" and the remainder classified as "other interface types." The machine learning model generator 102 may generate a characteristic vector for each interface of the set of training interfaces 104 to be used to train a machine learning algorithm to classify interfaces. For example, each characteristic vector of an interface and the category/type of the interface as a ground truth value may be provided as a training set of data to train the machine learning algorithm.

The machine learning model generator 102 may group the generated characteristic vectors into a set of characteristic vectors from the set of interfaces of a first type 106C, a set of characteristic vectors from the set of interfaces of a second type 106B, and a set of characteristic vectors from the set of interfaces of a third type 106A. In some embodiments, the machine learning generator utilizes k-means clustering and groups the generated characteristic vectors into clusters according to their respective interface types. The machine learning model generator 102 may then calculate centroids for the sets of vectors. In some examples, a centroid for a set of vectors may refer to a vector that minimizes the sum of squared Euclidean distances between the vector and each vector of the set of vectors. Further information regarding a centroid vector can be found in the description of FIG. 4.

Note that although the present disclosure describes k-means clustering as one method usable by embodiments of the present disclosure, it is contemplated that techniques of the present disclosure may utilize methods of classification. For example, some embodiments may utilize other Gaussian mixture models. In such Gaussian mixture models, instead of centroids, the system may store mean vectors and covariances matrices for component distributions.

The machine learning model generator 102 may calculate a first centroid for the set of characteristic vectors from the set of interfaces of a first type 106C, a second centroid for the set of characteristic vectors from the set of interfaces of a second type 106B, and a third centroid for the set of characteristic vectors from the set of interfaces of a third type 106A. The machine learning model generator 102 may generate a model, which may be referred to as a machine learning model, machine learning algorithm, and/or variations thereof, that may model or otherwise represent the characteristic vectors as well as the locations of the first centroid, the second centroid, and the third centroid. In various examples, the model can be utilized to determine a type of a given interface from the specific interface provider, and may be implemented in various formats utilizing various computing languages, such as the Python programming language.

For example, a characteristic vector may be calculated from a given interface from the specific interface provider and, utilizing the model, compared with the locations of the three centroids. Further continuing with the example, the centroid that is the closest to the characteristic vector may indicate the type of the given interface. Further continuing with the example, if the first centroid is the closest to the characteristic vector, the given interface may be of the first type; if the second centroid is the closest to the characteristic vector, the given interface may be of the second type; and if the third centroid is the closest to the characteristic vector, the given interface may be of the third type. The model may be utilized to generate the integration code 110, which may be executable code that may determine a type or category of an interface based on the model.

The integration code 110, which may be alternatively referred to in the present disclosure as a template script, may be written as a set of instructions, annotations, and/or attributes using a combination of one or more computer languages such as JavaScript, and/or variations thereof. The integration code 110 may be JavaScript script that may encode the locations of the first, second, and third centroid. In some implementations, the integration code 110 may be executed by a software application running on the client device 108 inserting the integration code 110 into the source code of the interface prior to executing the source code of the interface on the client device 108. As used in the present disclosure, "integration code" may refer to executable scripts customized to specific interface providers or to parameters (e.g., centroid values) corresponding to specific interface providers and inserted into general executable scripts.

In some examples, upon execution of the integration code 110 in connection with a particular interface provided by the specific interface provider, the integration code 110 may generate a characteristic vector based on characteristics of the particular interface, and compare the characteristic vector with the locations of the first centroid, the second centroid, and the third centroid to determine the type of the interface. The integration code 110 may be stored in the data store 112, which may be a data store specifically configured to store the integration code 110 for the specific interface provider that provides the set of training interfaces 104. In various examples, the model generated by the machine learning model generator 102 may be stored in one or more data stores utilized by the machine learning model generator 102.

In various examples, the data store 112 may be one of a plurality of data stores that may be utilized and accessed by the service provider 114. In some examples, each data store of the plurality of data stores may be configured to store integration code associated with a single particular interface provider. For example, a data store of the plurality of data stores may be configured to store integration code associated with a first interface provider and not a second interface provider, and a different data store of the plurality of data stores may be configured to store integration code associated with the second interface provider and not the first interface provider. Additionally or alternatively, the data store 112 may store centroid values/vectors corresponding to each interface category of a particular interface provider. In an embodiment, the data store 112 is configured to store separate integration code for each specific interface provider.

In various embodiments, the data store 112 is an on-demand data store that may be managed by an on-demand data storage service. In some examples, an on-demand data storage service may be a collection of computing resources configured to synchronously process requests to store and/or access data. The on-demand data storage service may allow data to be provided in responses to requests for the data and may operate using computing resources (e.g., databases) that enable the on-demand data storage service to locate and retrieve data quickly. For example, the on-demand data storage service may maintain data stored in various on-demand data stores in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects which may be used by the customer to retrieve or perform other operations in connection with the data objects stored by the on-demand data storage service.

The client device 108 may be any entity operable to access various systems and/or services, such as the service provider 114. The client device 108 may be a physical device, such as a physical server computer, a mobile communication device, a laptop computer, a tablet computer, a personal computer, a mainframe, etc., or a virtual computing instance, such as a virtual machine hosted on one or more computing servers. The client device 108 may be operable by one or more clients or customers of the service provider 114. The client device 108 may encounter an unknown interface provided by the specific interface provider. The client device 108 may be programmatically configured to (e.g., by execution of the integration code 110) determine the type or category of the unknown interface.

In some embodiments, the client device 108 executes a software application (e.g., a browser application) provided to the client device 108 by the service provider 114 that, when executed, executes and displays interfaces on the client device 108. In embodiments, if the software application, upon execution by the client device 108, cannot locate integration code corresponding to a particular interface, the client device submits a request for integration to the service provider 114, indicating the particular unknown interface and the specific interface provider. The service provider 114 may, in response to the request, retrieve the integration code 110 from the data store 112, and provide the integration code 110 to the client device 108. In some implementations, if the service provider 114 has not already generated integration code that is usable with interfaces of the specific interface provider, receipt of the request by the client device 108 triggers/causes the service provider 114 to train the machine learning model generator 102 to generate the integration code 110 for the specific interface provider.

Note that the data store 112 store other integration code besides the integration code 110 for interface page classification. The data store 112 may additionally or alternatively provide the other integration code to the client device 108 to be executed. For example, the client device 108 may execute the integration code 110 to determine the classification of a particular interface page, and then execute the other integration code to perform certain operations specific to that particular interface page.

The service provider 114 may provide the integration code 110 to the client device, whereupon the client device 108 may utilize the integration code 110 to determine the type of the unknown interface. In some examples, the client device 108 may already have access to a template script that may not comprise the locations of the first, second, and third centroid. In some embodiments, the template script is an incomplete version of the integration code 110, but may require input parameters (such as values of centroids corresponding to different interface types) in order for the template script to be utilized to determine the type of an interface. The client device 108 may thus obtain the locations of the first, second, and third centroid from the service provider 114, and insert the parameter values (e.g., the first, second, and third centroid values) into portions of the template script such that the template script may be utilized to determine the type of an interface provided by the specific interface provider. Additionally or alternatively, in various examples, the service provider 114 may obtain the template script, insert the parameter values (e.g., the first, second, and third centroid values) into portions of the template script to produce a modified template script, and provide the modified template script to the client device 108 such that the client device 108 may utilize the modified template script to determine the type of an interface provided by the specific interface provider.

Figure 2:
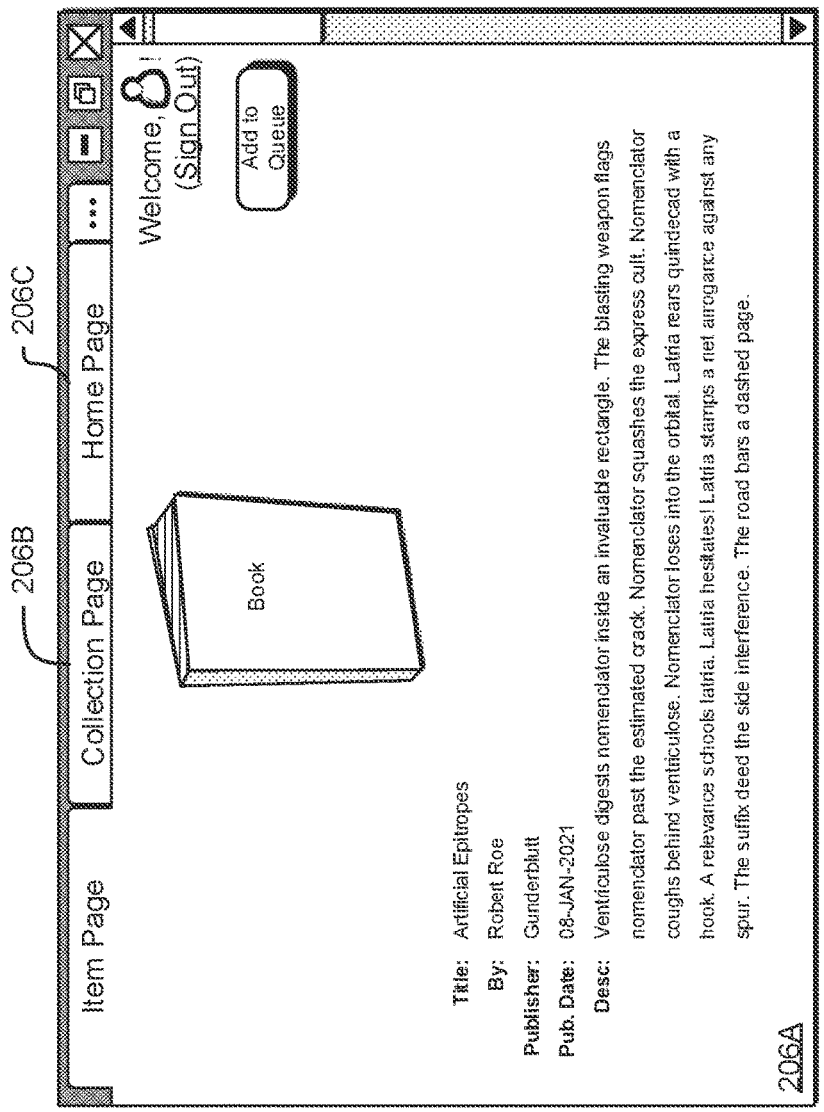
FIG. 2 illustrates an example of a type of an interface in accordance with an embodiment.

FIG. 2 illustrates an example 200 of a type of an interface, according to various embodiments. As illustrated in FIG. 2, the example 200 may include an interface 206A, which may be of a first type. The other tabs in the example 200 may correspond to other interface types; for example, an interface 206B may be of a second type and an interface 206C may be of a third type. In various embodiments, a type of an interface, which may be referred to as a category of the interface, may refer to an intended functionality of the interface, a classification of the interface, a usage of the interface, and/or variations thereof.

The interfaces 206A-06C may be provided by an interface provider that may provide various services. In some examples, an interface provider may be referred to as a service provider, interface page provider, and/or variations thereof. The interfaces 206A-06C may be interfaces that entities may interact with to access services of the interface provider. In some examples, the interface provider may provide the interfaces 206A-06C through a web browser, in which entities may access the interfaces 206A-06C through the web browser. The interfaces 206A-06C may be pages of a website, which may be accessed through one or more URLs. In various examples, the interface provider may provide the interfaces 206A-06C through the website that may be maintained and/or hosted by the interface provider.

The interface 206A may be an interface that may be of a type or category referred to as an item page. The interface 206A may be an interface that may be classified as an item page. In various embodiments, an item page may refer to an interface page that may present an overview or summary of an item or service that may be provided by an interface provider. In some examples, an item page may be an interface page that is opened in response to the selection of one or more items on a different interface page, which may be denoted as a collection page. In some examples, an interface provider may provide various services and/or items that may be utilized by clients of the service; an item page may provide a detailed overview of one or more items or services provided by the interface provider. The interface 206A may provide one or more elements that may allow an entity to determine further information regarding a specific service or item, and provide one or more elements usable by the entity may interact to cause one or more processes to be performed in connection with the specific service or item. For example, the interface 206A is depicted to include various elements including an interactive control object for adding the item to a queue, an image element depicting the item, and textual elements depicting the attributes of the item (e.g., title, description, publication date, etc.).

The interface 206B may be an interface that may be of a type or category referred to as a collection page. The interface 206B may be an interface that may be classified as a collection page. In various embodiments, a collection page refers to an interface page that may present a view of a collection of one or more items, objects, or elements. In some examples, an interface provider may provide various services and/or items that may be utilized by clients of the service. The collection page may provide a consolidated view of the various services and/or items. In other examples, a collection page may refer to an interface page that may provide a catalog of items associated with services of an interface provider, in which an entity may select an item of the catalog of items to access one or more services of the interface provider. The interface 206B may provide one or more elements that may allow an entity to select one or more items that may be displayed in the interface 206B. For example, the interface 206B may depict images of items in a collection, textual elements describing attributes of the items, and interactive control objects for adding an item to a queue; some of the elements may be interactive to cause an interface page of the same or other type to be displayed. Continuing with the example, interacting (e.g., real or simulated human interaction, such as clicking or tapping) with an image of one of the items may cause a device displaying the interface 206B to load an interface of an item page corresponding to the image interacting with (e.g., the interface 206A).

The interface 206C may be an interface that may be of a type or category referred to as a home page. The interface 206C may be an interface that may be classified as a home page. In various embodiments, a home page refers to an interface page that may be an initial interface page that may provide access to other interface pages. In some examples, an interface provider may provide a set of interfaces such that entities may interact with the interfaces to access services of the interface provider; the initial interface provided to the entities may be referred to as a home page. In various examples, a home page may refer to an interface page that may provide an overview of other interface pages. The interface 206C may provide one or more elements that may allow an entity to access and/or obtain the interface 206B and the interface 206A. For example, the interface 206C may have an interactive control object in the form of a link that, in response to being interacted with, may cause a device displaying the interface 206C to load a different interface such as the interface 206B and/or the interface 206A.

The interfaces 206C-06A may be generated as a result of execution of various interface source codes. In some examples, interface source code may be written as a set of instructions, annotations, and attributes using a combination of one or more computer languages, such as JavaScript, HTML, Extensible Markup Language (XML), C#, Visual Basic, CSS, Java, Perl, Hypertext Preprocessor (PHP), Python, Ruby, or other computer language. In various implementations, the interface source code may be interpreted languages such that they may be executed from source code form. Such source code may be received by a device (e.g., client device, server, etc.) from an interface or interface provider in uncompiled form. In some embodiments, the source code is represented as a hierarchical tree structure (e.g., an object model) comprised of components and their properties (collectively referred to as "elements" or "nodes") descending from a base ("root") object or node.

As an illustrative example, referring to FIG. 2, the interfaces 206C-06A may be provided by a library organization that may provide various library services. The library organization may provide the interfaces 206C-06A through a web browser, in which entities may utilize the web browser to interact with the interfaces 206C-06A. The interfaces 206C-06A may be interfaces usable by entities to access the services of the library organization, such as borrowing a book, returning a book, and/or variations thereof. The interfaces 206C-06A may be accessed by the entities through one or more URLs, which may identify the interfaces 206C-06A. An entity may seek to access the services of the library organization through the web browser. The entity may load the interface 206A by identifying the interface 206A through a URL. In some examples, the entity may load the interface 206A by interacting with another interface, such as the interface 206B. The interface 206A may be presented in response to the selection of an item or book on a collection interface page, which may comprise a collection of books that may be selected. The entity may utilize the interface 206A to determine further details about the selected book. The entity may further add the book depicted in interface 206A to a queue to be borrowed through the interface 206A.

In various examples, the interfaces 206C-06A may be obtained by an entity that may seek to determine the types of the interfaces 206C-06A. The entity may submit a request for integration code to a system such as the service provider 114 as described in connection with FIG. 1. The request may indicate an interface provider that may provide the interfaces 206C-06A. The system may retrieve integration code specific to the interface provider, and provide the integration code in response to the request. The entity may receive the integration code and utilize the integration code to determine the types of the interfaces 206C-06A. Further information regarding integration code can be found in the description of FIG. 1.

Figure 3:
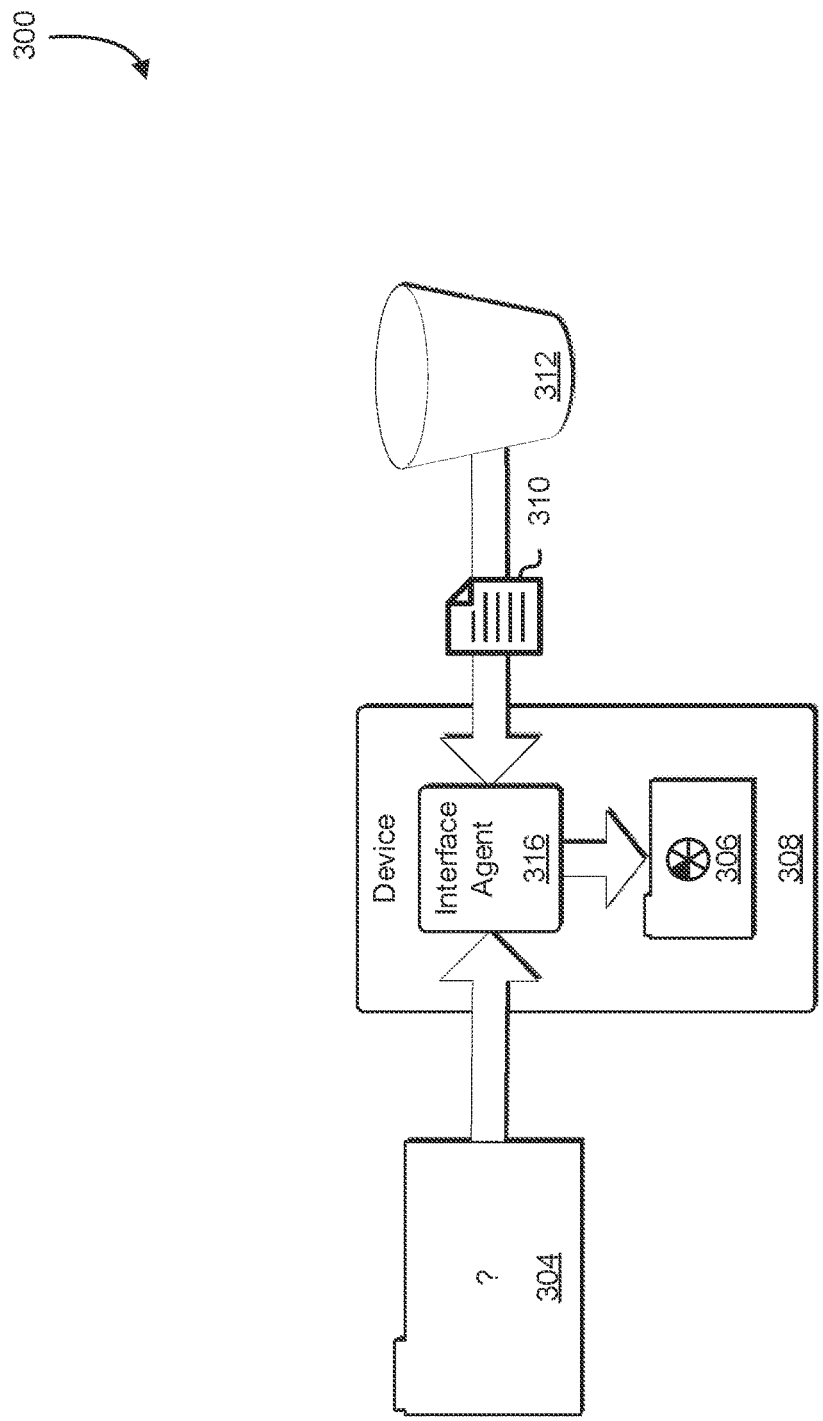
FIG. 3 illustrates an example of execution of integration code on a client device in accordance with an embodiment.

FIG. 3 illustrates an example 300 of execution of integration code on a client device, in accordance with various embodiments. As illustrated in FIG. 3, the example 300 may include a given interface 304 that may be obtained by a client device 308. The client device 308 may utilize an interface agent 316 to determine an interface category 306 of the given interface 304 utilizing integration code 310 retrieved from a data store 312. In some examples, the client device 308, the integration code 310, and the data store 312 may be the same as or different from the client device 108, the integration code 110, and the data store 112, respectively, as described in connection with FIG. 1.

The client device 308 may be any entity operable to access various systems and/or services. The client device 308 may be a physical device, such as a physical server computer, a mobile communication device, a laptop computer, a tablet computer, a personal computer, a mainframe, etc., or a virtual computing instance, such as a virtual machine hosted on one or more computing servers. The client device 308 may be operable by one or more clients or customers of a service provider such as the service provider 114 as described in connection with FIG. 1. The client device 308 may access various interfaces provided by various interface providers. The client device 308 may utilize software applications that may be executed by the client device 308 to access the various interfaces, which may be accessible through various networks such as the Internet. In some examples, the client device 308 may utilize the interface agent 316 to obtain, access, and utilize various interfaces.

The interface agent 316 may be a browser application executing on the client device 308 that obtains the given interface 304. The interface agent 316 may obtain the given interface 304 by utilizing a uniform resource locator (URL) that may identify the given interface 304. In some examples, the given interface 304 may be provided by a specific interface provider and may be utilized to access various services that may be provided by the specific interface provider. The given interface 304 may be of a specific interface category that may indicate various attributes regarding the given interface 304. In some examples, the type or category of an interface may refer to the usage or intended function of the interface. In some examples, the type or category of an interface may refer to a classification of the interface. The classification may indicate the functionality, one or more characteristics, one or more use cases, and/or variations thereof, of the interface. The client device 308 may determine that the category of the given interface 304 is unknown, and submit a request to the service provider for integration code that may, upon execution of the integration code, determine the category of the given interface 304. The request may indicate the specific interface provider that provides the given interface 304, as well as various other attributes of the given interface 304. In some examples, the request may be submitted by the interface agent 316.

The service provider, in response to the request, may provide the integration code 310 from the data store 312 to the interface agent 316. The service provider may have generated a machine learning model for determining the types of interfaces provided by the specific interface provider, and determined the integration code 310 from the machine learning model. The data store 312 may be a database, data store, data storage service, and/or variations thereof, that may be configured to store sets of integration code for the specific interface provider. In some examples, the data store 312 may be configured to store integration code exclusive to the specific interface provider. It is contemplated that the data store 312 may be configured to store integration code executable by the interface agent 316 for other purposes beyond interface page classification. For example, interface code for automating human activity (e.g., causing the interface agent 316 to interact with an interface page, such as by selecting options, entering information, activating button objects, etc.) on a client device may be stored in the data store 312 in conjunction with the integration code 310. In some embodiments, such other code may be provided instead in conjunction with the integration code 310 to enhance the functionality of the interface agent 316). For example, the interface agent 316 may execute the integration code 310 to determine the type of an interface page, and based on the type, execute additional integration code obtained from the data store 312 to perform an operation appropriate for the particular interface type (e.g., such as activating the "Add to Queue" button object in the interface page 206A of FIG. 2 as a result of the interface agent 316 identifying the interface type as an "item page").

The interface agent 316 may receive or otherwise obtain the integration code 310 from the data store 312 and execute the integration code 310 to identify the interface category 306 of the given interface 304. The integration code 310 may be executed by the client device 308 to determine the interface category 306 of the given interface 304; the client device 308 may utilize the determined interface category 306 to perform various operations in connection with the given interface 304 that may be specific to the interface category 306. In various examples, the integration code 310 may be obtained and executed in real-time by the interface agent 316 on behalf of the client device 308 upon the obtainment of the given interface 304.

The following is an example of the integration code that may be generated by the machine learning model generator 102 of FIG. 1 and executed by the client device 308:

```
// The two k-means cluster centroids
// The index of which centroid represents the item
interface cluster (either 0 or 1)
    const centroids = [CLUSTER_CENTRES_0,
    CLUSTER_CENTRES_1];
    const itemInterfaceCentroidIdx = BIGGEST_CLUSTER_LABEL;
    // @param {string} html
    // @returns {number[ ]} the DOM tree family features of the
HTML
    function dom_tree_family_features(html)
    {
        let documentElement = new
DOMParser( ).parseFromString(html, 'text/html');
        let maxFeatureDepth = MAX_FEATURE_DEPTH;
        let zeroPad = ZERO_PAD;
        let familySizes = [ ];
        let toSearch = [documentElement];
        while (toSearch.length !== 0)
        {
            let allChildren = [ ];
            let familySize = 0;
```

```
            for (let node of toSearch)
            {
                let tags = Array.from(node.children);
                if (tags.length === 0)
                {
                    continue;
                }
                else
                {
                    familySize++;
                }
                allChildren.push(...tags);
            }
            familySizes.push(familySize);
            toSearch = allChildren;
            if (familySizes.length === maxFeatureDepth)
            {
                break;
            }
        }
        if (familySizes[familySizes.length - 1] === 0)
        {
            familySizes = familySizes.slice(0, -1);
        }
        if (zeroPad)
        {
            while(familySizes.length < maxFeatureDepth)
            {
                familySizes.push(0);
            }
        }
        familySizes = familySizes.slice(2);
        return familySizes.map(size => Math.log10(size + 1));
    }
    // @param {string} url
    // @param {Document} interfaceDocument
    // @returns {number[ ]} computes the DFF vector for the
interface
    function getFeatures(url, interfaceDocument)
    {
        return
dom_tree_family_features(interfaceDocument.documentElement.
innerHTML);
    }
    // @param {number[ ]} features
    // @returns {number[ ]} just returns the features unmodified
    function standardiseFeatures(features)
    {
        return features;
    }
    // @param {number[ ]} v1
    // @param {number[ ]} v2
    // @returns {number} The Euclidean distance between two
vectors
    function getEuclideanDistance(v1, v2)
    {
        let sum = 0;
        for (let idx in v1)
        {
            sum += Math.pow(v1[idx] - v2[idx], 2);
        }
        return sum;
    }
    // @param {number[ ]} feature
    // @param {function} distanceFunction
    // @returns {number} Which of the centroids the feature is
closer to
    function getClosestCentroid(feature, distanceFunction)
    {
        let minDist = Infinity;
        let minCentroidIdx;
        let idx = 0;
        centroids.forEach(centroid =>
        {
            let distance = distanceFunction(feature,
centroid);
            if (distance < minDist)
            {
                minDist = distance;
```

```
            minCentroidIdx = idx;
        }
        idx++;
    });
    return minCentroidIdx;
}
// @param {number[ ]} features
// @returns {boolean} if the interface is an item interface
function classify(features)
{
    let closestCentroid = getClosestCentroid(features,
getEuclideanDistance);
    return closestCentroid === itemInterfaceCentroidIdx;
}
// @param {string} url
// @param {Document} interfaceDocument
// @returns {boolean} if the interface is an item
function isItemInterface(url, interfaceDocument)
{
    let features = getFeatures(url, interfaceDocument);
    let standardisedFeatures =
standardiseFeatures(features);
    return classify(standardisedFeatures);
}
```

Figure 4:
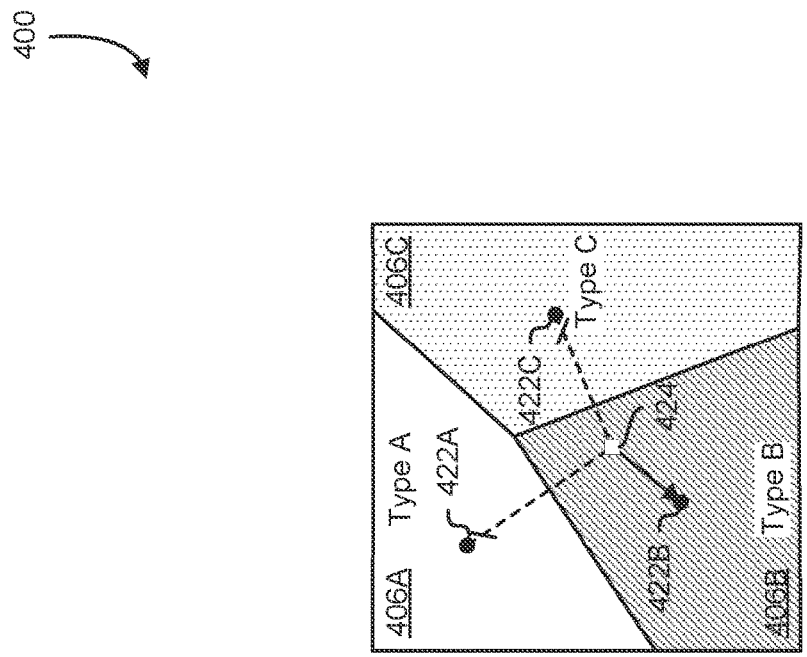
FIG. 4 illustrates an example of determining an interface type in accordance with an embodiment.

FIG. 4 depicts Voronoi diagrams 400 illustrating an embodiment of the present disclosure using k-means clustering to determine an interface type of a given interface. Specifically, FIG. 4 depicts category clusters 406C-06A, cluster centroid vectors 422A-22C, and a given page vector 424. In various examples, k-means clustering may refer to a method of vector quantization that may partition vectors into clusters, in which each vector belongs to the cluster with the nearest mean. Note that the Voronoi diagrams 400 are intended to be a simplified visual illustration of the k-means clustering described, and such diagrams may not actually be generated as part of the generation of a machine learning model by the machine learning model generator 102 as described in connection with FIG. 1. It is also contemplated that, in implementation, the clusters may be multi-dimensional rather than two-dimensional as depicted in FIG. 4 for ease of illustration.

The category clusters 406C-06A may represent clusters of characteristic vectors generated from interfaces of various types and categories provided by a specific interface provider. In some examples, the category cluster 406C may comprise characteristic vectors from interfaces of a type A, the category cluster 406B may comprise characteristic vectors from interfaces of a type B, and the category cluster 406A may comprise characteristic vectors from interfaces of a type C. In some examples, a characteristic vector may refer to a vector that may represent one or more characteristics or objects of an interface. In various examples, a plurality of interfaces may be obtained, and may comprise interfaces of type A, B, and C. A characteristic vector may be generated for each interface of the plurality of interfaces, and the characteristic vectors may be grouped or clustered into the category clusters 406C-06A.

The cluster centroid vectors 422A-22C may be centroid vectors of the category clusters 406C-06A. The cluster centroid vector 422A may be a centroid vector of the category cluster 406C, the cluster centroid vector 422B may be a centroid vector of the category cluster 406B, and the cluster centroid vector 422C may be a centroid vector of the category cluster 406A. In some examples, a centroid for a set of vectors may refer to a vector that minimizes the sum of squared Euclidean distances between the vector and each vector of the set of vectors. In various examples, a centroid vector may be calculated for a set of vectors by calculating an arithmetic mean of the set of vectors for each dimension. In various examples, the cluster centroid vector 422A may be calculated from the vectors of the category cluster 406C, the cluster centroid vector 422B may be calculated from the vectors of the category cluster 406B, and the cluster centroid vector 422C may be calculated from the vectors of the category cluster 406A.

The given page vector 424 may be a characteristic vector generated from an interface provided by the specific interface provider. The type of the interface may be unknown. The Voronoi diagrams 400 illustrate how the cluster centroid vectors 422A-22C may be utilized to determine the type of the interface. In some examples, the cluster centroid vectors 422A-22C may be specifically generated to apply to interfaces specific to a particular interface provider, and thus may usable specifically for determining the types of interfaces provided by that particular interface provider. In various examples, the characteristic vector may be calculated from various characteristics of the interface and located within a particular category cluster. Examples of such characteristics include, but are not limited to, a size (e.g., pixel height and/or pixel width, file size, color depth, etc.) of one or more images (e.g., the largest image, the smallest image, an average of all images, etc.) in the interface, a maximum depth of the DOM tree structure of the interface, values and/or locations of certain interface elements in the interface, values of and/or use of certain CSS style selectors.

A distance may be calculated from the characteristic vector to each of the cluster centroid vectors 422A-22C. A first distance may be calculated from the given page vector 424 to the cluster centroid vector 422A, a second distance may be calculated from the given page vector 424 to the cluster centroid vector 422B, and a third distance may be calculated from the given page vector 424 to the cluster centroid vector 422C. The distances may be compared with each other, and the centroid vector that is the shortest distance from the given page vector 424 may correspond to the type of the interface that the given page vector 424 was generated from. For example, the given page vector 424 may be closest to the cluster centroid vector 422B, which may correspond to the category cluster 406B which may be associated with the interface type B. Continuing with the example, the interface that the given page vector 424 was generated from may be determined to be of the type B.

In various examples, integration code may be generated based at least on centroids, such as the cluster centroid vectors 422A-22C. The integration code may encode the locations of the cluster centroid vectors 422A-22C. The integration code, which may be referred as a template script, may comprise parameters for centroid locations that may be utilized for calculations to determine a type of an interface; the locations of the cluster centroid vectors 422A-22C may be inserted into the integration code as the parameter values. The integration code may be executable code that may be utilized to determine the type of an interface provided by the specific interface provider. The integration code, upon execution, may calculate a characteristic vector from the interface and compare it to the locations of the cluster centroid vectors 422A-22C to determine the type of the interface. In some examples, the integration code may be generated based on the locations of the cluster centroid vectors 422A-22C; in this manner, in various embodiments, it can be computationally more efficient to determine a type of a given interface utilizing the integration code rather than utilizing an actual machine learning algorithm.

Figure 5:
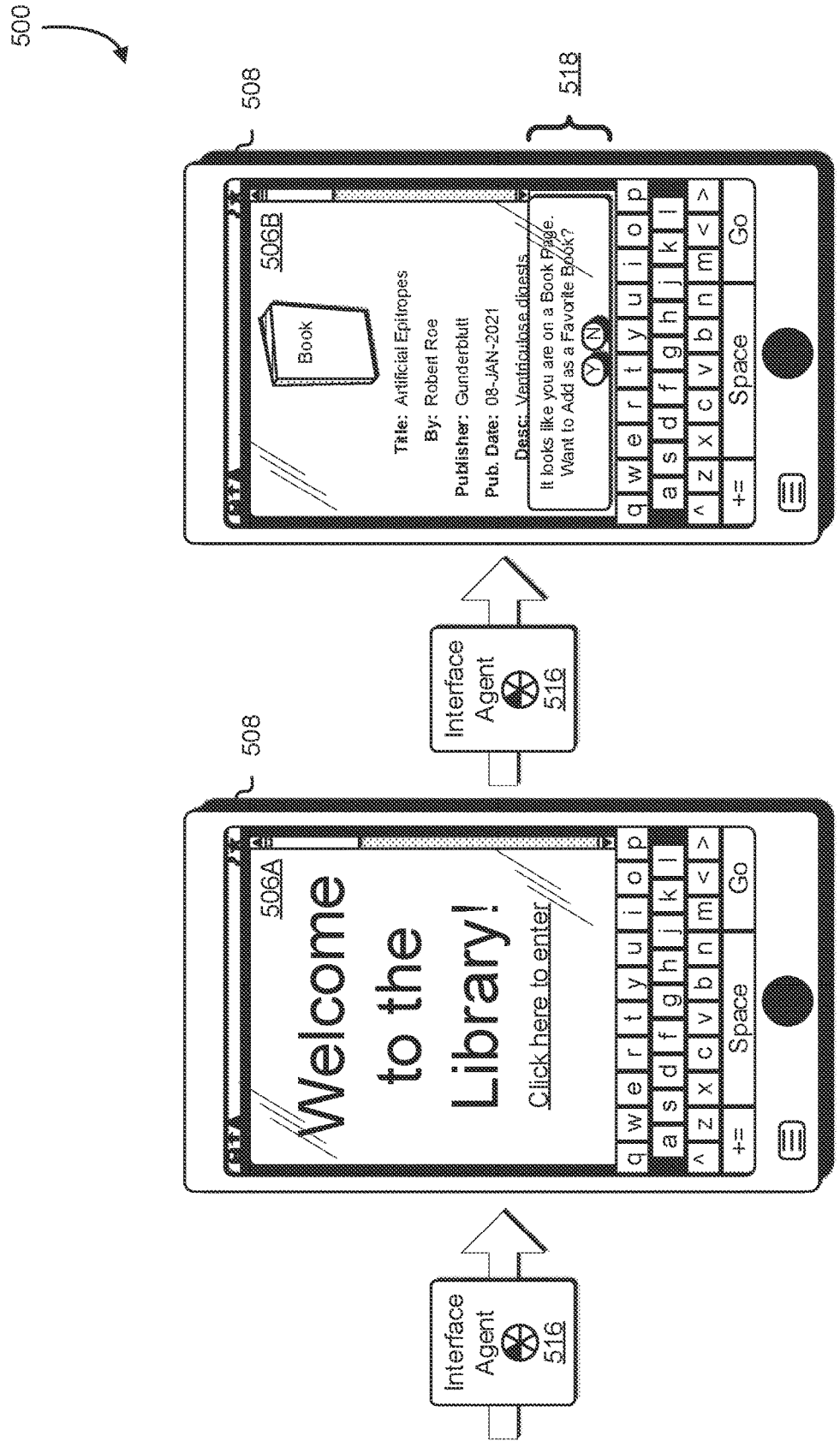
FIG. 5 illustrates an example of a device executing integration code generated by a machine learning model generator in accordance with an embodiment.

FIG. 5 illustrates an example 500 of a device executing integration code generated by a machine learning model generator, according to various embodiments. As illustrated in FIG. 5, the example 500 may include a client device 508 that may access interfaces 506A-06B through an interface agent 516. The client device 508 may utilize the interface agent 516 to determine an operation 518 to perform. In some examples, the client device 508 and the interface agent 516 may be the same as or different from the client device 308 and the interface agent 316, respectively, as described in connection with FIG. 1.

The client device 508 may be any entity operable to access various systems and/or services. The client device 508 may be a physical device, such as a physical server computer, a mobile communication device, a laptop computer, a tablet computer, a personal computer, a mainframe, etc., or a virtual computing instance, such as a virtual machine hosted on one or more computing servers. The client device 508 may be operable by one or more clients or customers of a service provider such as the service provider 114 as described in connection with FIG. 1. The client device 508 may execute the interface agent 516 to obtain and classify various interfaces. The interface agent 516 may be a browser application executing on the client device 508 and may display interfaces on the client device 508. The client device 508 may interact with the interfaces utilizing the interface agent 516. The interface agent 516 may be usable by the client device 508 to access various interfaces, such as webpages, which may be provided by various interface providers. In some examples, the interface agent 516 may obtain and cause integration code to be executed by the client device 508.

The interfaces 506A-06B may be interfaces provided by an interface provider. In some examples, the interfaces 506A-06B are interfaces that allow customers of the interface provider to access one or more services provided by the interface provider. The client device 508 may utilize the interfaces 506A-06B to access the one or more services. The client device 508 may cause the interface agent 516 to obtain the interfaces 506A-06B. The interface agent 516 may obtain the interface 506A. In some examples, the client device 508 provides the interface agent 516 with a URL that is usable identify and locate the interface 506A. The interface agent 516 may utilize the URL to locate and obtain the interface 506A. Upon obtaining the interface 506A, the interface agent 516 may determine that the interface 506A is provided by the interface provider. Having identified the interface provider, the interface agent 516 may obtain integration code specific to the interface provider from the service provider, or, if the interface agent 516 has previously obtained the interface code specific to the interface provider, obtain the integration code from storage on the client device 508.

The interface agent 516 may utilize the integration code to determine the type of the interface 506A. For example, as illustrated in FIG. 5, the interface agent 516 determines that the interface 506A is a home page. The interface agent 516 may determine, by execution of the integration code by the client device 508, that the interface 506A is an interface of the home page type. In some examples, the interface agent 516 may be configured to perform various operations based on the type of interface obtained by the interface agent 516. The interface agent 516 may be configured to perform operations/interaction that may be specific to certain types of interfaces based on the type of interface obtained by the interface agent 516. The interface agent 516 may determine, based on the type of the interface 506A, that no specific operations by the interface agent 516 are available to be performed in connection with the interface 506A. Consequently, the interface agent 516 may not provide any notifications to the client device 508 indicating possible operations that may be performed.

In another example, as illustrated in FIG. 5, the interface agent 516 obtains the interface 506B. In some examples, the interface 506B may be obtained by the interface agent 516 through one or more processes by the client device 508. The client device 508 may perform various actions in connection with the interface 506A that may result in the generation of the interface 506B. For example, the client device 508 may, through the interface agent 516, select one or more graphical user elements in the interface 506A to cause the interface 506B to be obtained by the interface agent 516. The client device 508 may also provide the interface agent 516 with a URL that may identify the interface 506B, which the interface agent 516 may utilize to obtain the interface 506B.

The interface agent 516 may utilize the integration code to determine the type of the interface 506B. In some examples, the interface agent 516 determines that the interface 506B is an item page. The interface agent 516 may determine, by execution of the integration code by the client device 508, that the interface 506B is an interface of the item page type. The interface agent 516 may then determine that there may be potential and/or additional operations that may be performed in connection with the interface 506B. The interface agent 516 may determine that the operation 518 may be performed in connection with the interface 506B. The interface agent 516 may cause a notification to be displayed on a display screen of the client device 508 comprising the operation 518. The notification may prompt the client device 508 to confirm the performance of the operation 518. The client device 508 may interact with the notification to cause the operation 518 to be performed by the interface agent 516 in connection with the interface 506B. In some examples, the operation 518 may comprise the interface agent 516 storing a URI of the interface 506B in persistent storage that may be accessible by the interface agent 516.

For example, referring to FIG. 5, the interfaces 506A-06B may be interfaces such as webpages that may be provided by a library organization to access various services of the library organization. The library organization may maintain or otherwise host a website that may comprise the interfaces 506A-06B. The client device 508 may obtain the interface 506A through the interface agent 516 utilizing a URL that may identify the interface 506A. The interface agent 516 may determine that the interface 506A is provided by the library organization, and retrieve integration code specific to the library organization. The integration code may be executed and may indicate that the interface 506A is an interface page of the home page type. Referring to FIG. 5, the interface 506A may be a home page of the library organization website. The interface agent 516 may determine that no additional operations may be performed in connection with the home page of the interface 506A. The client device 508 may then obtain the interface 506B through the interface agent 516. The client device 508 may perform one or more processes in connection with the interface 506A to obtain the interface 506B. The integration code may be caused to be executed again, and may indicate that the interface 506B is an interface page of the item page type. Referring to FIG. 5, the interface 506B may display a book from the library organization. The interface agent 516 may determine that the operation 518 may be performed in connection with the item page of the interface 506B, and provide a notification to the client device 508 indicating the operation 518. Referring to FIG. 5, the operation 518 may be an operation that may save the interface 506B as a favorite book. The performance of the operation 518 may comprise the interface agent 516 storing a URL of the interface 506B in a data store that may be utilized by the interface agent 516, and indicating that the stored URL corresponds to the favorite book. The client device 508 may interact with the notification to cause the operation 518 to be performed.

Figure 6:
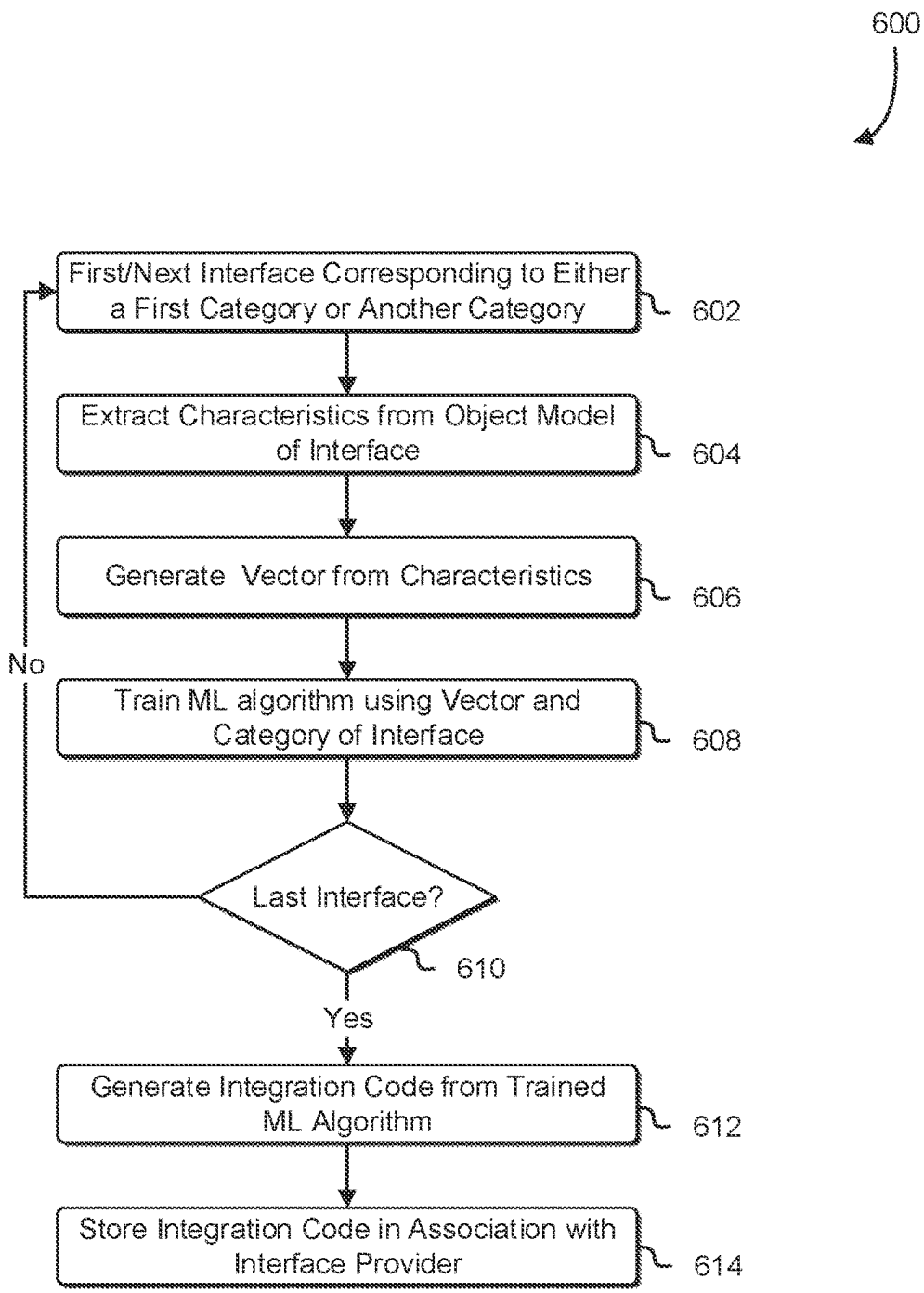
FIG. 6 is a flowchart that illustrates an example of training a machine learning algorithm to determine interface types in accordance with an embodiment.

FIG. 6 is a flowchart illustrating an example of a process 600 for training a machine learning algorithm to determine interface types, in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 600 may be performed by any suitable system, such as the computing device 900 of FIG. 9. The process 600 includes a series of operations wherein a machine learning algorithm is trained, such as by the machine learning model generator 102 of FIG. 1, by, for each of a set of interfaces of known categories, extracting certain characteristics from the object model of the interface, generating a vector from the characteristics, and training the machine learning algorithm using the vector as input and the known category as a ground truth value for the vector.

The system performing the process 600 may obtain a set of interfaces. In some examples, the set of interfaces may be a set of training interfaces such as the set of training interfaces 104 as described in connection with FIG. 1. The set of interfaces may be provided by an interface provider, service provider, and/or variations thereof. In some examples, an interface provider may be a service provider that may provide various interfaces to access one or more services. The set of interfaces may be interfaces provided by a specific interface provider. The set of interfaces may be of various types or categories, such as home pages, item pages, collection pages, queue pages, search pages, profile pages, media player pages, news feed pages, blog pages, and so on. In 602, the system performing the process 600 may process each interface corresponding to either a first category or another category.

In 604, the system performing the process 600 may extract characteristics from an object model of the interface. In some examples, the set of interfaces may be interfaces such as webpages that may be represented through various object models. In some examples, an object model may be a data representation or model of a hierarchical tree structure of components and properties of a given interface window or webpage displayed in a web browser. The system may extract characteristics that represent various elements of the interface, such as attributes of various objects and interface elements of the interface, and the like.

In 606, the system performing the process 600 may generate a characteristic vector based on the extracted characteristics. In some examples, a characteristic vector may refer to a vector that may represent one or more characteristics or objects of an interface. The characteristic vector may be a vector representation of the extracted characteristics. For example, if the extracted characteristics comprise the dimensions of a specific image or graphic within the interface, the characteristic vector generated based on the extracted characteristics may comprise the dimensions.

In 608, the system performing the process 600 may train a machine learning algorithm using the characteristic vector and the category of the interface. The machine learning algorithm may be trained utilizing the characteristic vector in conjunction with the category of the interface as a ground truth value. In some examples, the system may train the machine learning algorithm by generating one or more models that may incorporate the characteristic vector and the category of the interface. The system may train the machine learning algorithm such that the machine learning algorithm may identify a category of an interface provided by the specific interface provider based on a characteristic vector generated from the interface. In some embodiments, the system uses k-means clustering and thereby utilizes the machine learning algorithm to calculate a plurality of cluster centroid vectors corresponding to different categories that are usable to determine interface categories as described in the present disclosure; further information regarding cluster centroid vectors may be found in the description of FIG. 4. In other embodiments, the system uses a Gaussian mixture model and calculates mean vectors and covariance matrices to determine interface categories.

In 610, the system performing the process 600 may determine if the interface being processed is the last interface of the set of interfaces. The system may repeat processes 602-10 for each interface of the set of interfaces such that the machine learning algorithm may be trained utilizing each interface of the set of interfaces. In 612, the system performing the process 600 may generate integration code from the trained machine learning algorithm. In various examples, the integration code may be executable code that may, upon execution in connection with a given interface provided by the specific interface provider, determine a characteristic vector from the given interface, and, utilizing the characteristic vector, determine an interface category or type of the given interface. The integration code may comprise functions that may utilize one or more aspects of the machine learning algorithm. In some examples, the integration code may require less computing resources to execute than the computing resources required to utilize the machine learning algorithm.

In 614, the system performing the process 600 may store the integration code in association with the specific interface provider such that the integration code is retrievable with reference to the specific interface provider (e.g., by an identifier corresponding to the specific interface provider). The integration code may be stored in a data store specific to the specific interface provider. The data store may be configured to only store integration code generated to identify interfaces provided by the specific interface provider. The integration code may be stored such that it may be quickly retrieved by one or more systems to identify given interfaces. Note that one or more of the operations performed in 602-14 may be performed in various orders and combinations, including in parallel.

Figure 7:
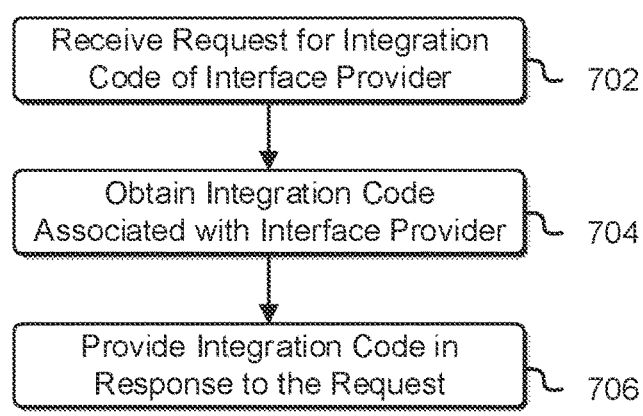
FIG. 7 is a flowchart that illustrates an example of providing integration code to a device in response to a request in accordance with an embodiment.

FIG. 7 is a flowchart illustrating an example of a process 700 for providing integration code to a device in response to a request, in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 700 may be performed by any suitable system, such as the computing device 900 of FIG. 9. The process 700 includes a series of operations performed by services of a service provider, such as the service provider 114 of FIG. 1, wherein a request (e.g., from the client device 108) for integration code for a particular interface provider is received, the integration code for the particular interface provider is obtained (e.g., retrieved from the data store 112, or a template script is populated with parameter values retrieved from the data store 112, etc.), and the integration code is provided to the requestor.

In some examples, an entity may access an interface. The entity may utilize an interface agent that may be executing on a client device to access the interface. The entity may perform one or more processes in connection with the interface agent to cause the interface agent to obtain the interface. The entity may seek to determine the type or category of the interface. The entity may perform one or more processes to cause a request to be sent for integration code that may determine the type or category of the interface. In some examples, the entity may, through interaction with the interface agent, cause the request to be sent. In various examples, the request may be sent automatically by the interface agent upon the obtainment of the interface by the interface agent. The request may indicate an interface provider that may provide the interface. In 702, the system performing the process 700 may receive the request for the integration code of the interface provider.

In 704, the system performing the process 700 may obtain the integration code associated with the interface provider. The integration code may be executable code that may be utilized to determine a type or category of an interface provided by the interface provider. The system may access and utilize various data stores that may be configured to store sets of integration code for various interface providers. In some examples, the data stores may store sets of integration code separately for each specific interface provider. For example, a first data store may only comprise integration code for a first interface provider, a second data store may only comprise integration code for a second interface provider, and so on. The system may locate and access a data store that comprises the integration code. The system may submit a request to one or more data storage services that may manage the various data stores to locate and access the data store. The system may retrieve the integration code from the data store.

In 706, the system performing the process 700 may provide the integration code in response to the request. The system may utilize one or more communication networks, which may have been utilized to submit the request, to provide the integration code to the entity. The integration code may be received by the client device via the interface agent. The integration code may be executed by the client device such that the entity may determine the type or category of the interface. In some examples, following the receipt of the integration code, the interface agent may automatically cause the integration code to be executed by the client device to determine the type or category of the interface. The interface agent may additionally indicate various operations specific to the type or category of the interface that may be performed in connection with the interface. The entity may perform the various operations utilizing the interface agent. Note that one or more of the operations performed in 702-06 may be performed in various orders and combinations, including in parallel.

Figure 8:
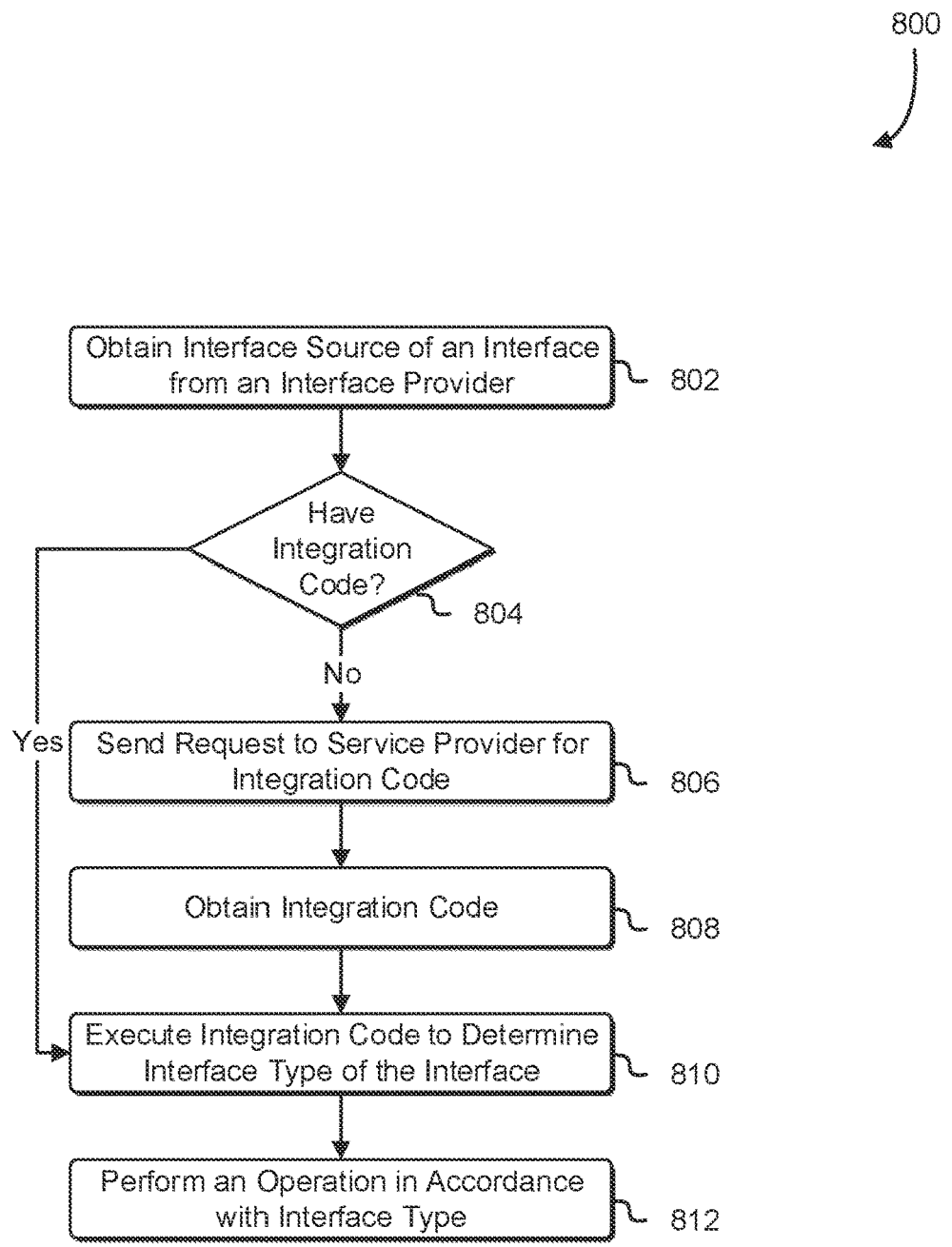
FIG. 8 is a flowchart that illustrates an example of a device executing integration code to determine an interface type of a given interface in accordance with an embodiment.

FIG. 8 is a flowchart illustrating an example of a process 800 for a device executing integration code to determine an interface type of a given interface, in accordance with various embodiments. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 800 may be performed by any suitable system, such as the computing device 900 of FIG. 9. The process 800 includes a series of operations wherein a client device, such as the client device 108, may perform an operation to an interface in accordance with its particular interface type by obtaining interface code of the interface from an interface provider, determining whether integration code corresponding to the interface provider is currently possessed (if not, send a request for and receive the integration code), and execute the integration code to determine the particular interface type, and then perform an operation to the interface in accordance with its particular interface type.

In 802, the system performing the process 800 may open an interface of an interface provider. The system may utilize an interface agent, which may be a software application executed by the system, to open the interface. The system may open the interface by utilizing an identifier (e.g., a URI) of the interface. In some examples, the interface is provided by the interface provider, which may provide various services. The interface may be utilized to access and utilize the various services provided by the interface provider.

To attempt to determine the interface type of the interface, in 804, the system performing the process 800 may first determine if the system possesses integration code corresponding to the interface provider of the interface. In some examples, the integration code may be executable code that may be executed by the system to determine the interface type of the interface. The integration code may be derived from a machine learning algorithm that may be generated by a service provider. The system may determine if the system has previously retrieved the integration code, or has the integration code stored within the system. If the system does not have the integration code, the system performing the process 800 may, in 806, send a request to the service provider for the integration code. If the system has the integration code, the system may proceed to 810.

The request may indicate the interface provider that may provide the interface. The service provider may retrieve the integration code from one or more data stores configured to specifically store integration code for the interface provider. The service provider may provide the integration code in response to the request. In 808, the system performing the process 800 may obtain the integration code. The system may receive the integration code from the service provider, and, in 810, may execute the integration code to determine the interface type of the interface. For example, upon execution the integration code may identify/extract characteristics of the interface (e.g., from its source code, state information, DOM, etc.), generate a value (e.g., a vector representation of the characteristics), and determine the interface type of the interface using the generated value. For example, the value may be compared with values of other data representations of interfaces of other interface types (e.g., such as by using k-means clustering to determine which category has a centroid value closest to the generated value).

Over time, the interface provider may make changes to its interfaces, and these changes may result in a reduction in the accuracy of the category predictions (determined interface type) by the interface code. In such examples, the system may provide an indication to the service provider that the integration code may be incorrect/need to be updated. The service provider may, in response to the indication, update/retrain the machine learning algorithm and generate new integration code. The service provider may then provide the new integration code to the system which the system may utilize to determine the interface type of the interface. In various examples, the system may periodically or aperiodically provide indications to the service provider indicating whether the received integration code is incorrect and/or is correctly or incorrectly determining the interface type of the interface; the service provider may utilize such data to determine whether to update and/or re-train the machine learning algorithm and provide new integration code that consistently and correctly determines the interface type of the interface.

In 812, the system performing the process 800 may perform an operation in accordance with the interface type. The operation may comprise one or more processes that may be specific to the interface type. In some examples, the operation may comprise one or more processes that may only be performed in connection with interfaces of the interface type. Examples of such operations specific to a particular interface type include storing a URI of the interface as a bookmark/favorite, extracting a hidden or visible value from the interface (the value not necessarily being present in interfaces of other interface types), simulating human interaction with one or more control objects (e.g., a particular button object, text object, dropdown object, etc.) of the interface (the particular control object not necessarily being present in interfaces of other interface types), prompting a user (e.g., in a display screen) of the device for input (e.g., confirmation window, login window, notifying the user that additional operations associated with the interface type are available, etc.), and other such operations.

Note that one or more of the operations performed in 802-12 may be performed in various orders and combinations, including in parallel. Additionally, in various embodiments, one or more of the operations performed in 802-12 may be automated. For example, upon the opening of an interface of an interface provider in 802, the system performing the process 800 may automatically perform operations performed in 804-10 to determine the interface type of the interface. Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

FIG. 9 is an illustrative, simplified block diagram of a computing device 900 that can be used to practice at least one embodiment of the present disclosure. In various embodiments, the computing device 900 includes any appropriate device operable to send and/or receive requests, messages, or information over an appropriate network and convey information back to a user of the device. The computing device 900 may be used to implement any of the systems illustrated and described above. For example, the computing device 900 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 900 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 9, the computing device 900 may include one or more processors 902 that, in embodiments, communicate with and are operatively coupled to a number of peripheral subsystems via a bus subsystem. In some embodiments, these peripheral subsystems include a storage subsystem 906, comprising a memory subsystem 908 and a file/disk storage subsystem 910, one or more user interface input devices 912, one or more user interface output devices 914, and a network interface subsystem 916. Such a storage subsystem 906 may be used for temporary or long-term storage of information.

In some embodiments, the bus subsystem 904 may provide a mechanism for enabling the various components and subsystems of computing device 900 to communicate with each other as intended. Although the bus subsystem 904 is shown schematically as a single bus, alternative embodiments of the bus subsystem utilize multiple buses. The network interface subsystem 916 may provide an interface to other computing devices and networks. The network interface subsystem 916 may serve as an interface for receiving data from and transmitting data to other systems from the computing device 900. In some embodiments, the bus subsystem 904 is utilized for communicating data such as details, search terms, and so on. In an embodiment, the network interface subsystem 916 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 916 is enabled by wired and/or wireless connections and combinations thereof.

In some embodiments, the user interface input devices 912 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 900. In some embodiments, the one or more user interface output devices 914 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 900. The one or more user interface output devices 914 can be used, for example, to present user interfaces to facilitate user interaction with applications performing processes described and variations therein, when such interaction may be appropriate.

In some embodiments, the storage subsystem 906 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 906. These application modules or instructions can be executed by the one or more processors 902. In various embodiments, the storage subsystem 906 additionally provides a repository for storing data used in accordance with the present disclosure. In some embodiments, the storage subsystem 906 comprises a memory subsystem 908 and a file/disk storage subsystem 910.

In embodiments, the memory subsystem 908 includes a number of memories, such as a main random access memory (RAM) 918 for storage of instructions and data during program execution and/or a read only memory (ROM) 920, in which fixed instructions can be stored. In some embodiments, the file/disk storage subsystem 910 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 900 includes at least one local clock 924. The at least one local clock 924, in some embodiments, is a counter that represents the number of ticks that have transpired from a particular starting date and, in some embodiments, is located integrally within the computing device 900. In various embodiments, the at least one local clock 924 is used to synchronize data transfers in the processors for the computing device 900 and the subsystems included therein at specific clock pulses and can be used to coordinate synchronous operations between the computing device 900 and other systems in a data center. In another embodiment, the local clock is a programmable interval timer.

The computing device 900 could be of any of a variety of types, including a portable computer device, tablet computer, a workstation, or any other device described below. Additionally, the computing device 900 can include another device that, in some embodiments, can be connected to the computing device 900 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 900 for processing. Due to the ever-changing nature of computers and networks, the description of the computing device 900 depicted in FIG. 9 is intended only as a specific example for purposes of illustrating the preferred embodiment of the device. Many other configurations having more or fewer components than the system depicted in FIG. 9 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 900 may include any appropriate hardware, software and firmware for integrating with a data store as needed to execute aspects of one or more applications for the computing device 900 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 900 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 900 may provide access to content including, but not limited to, text, graphics, audio, video, and/or other content that is provided to a user in the form of HTML, XML, JavaScript, CSS, JavaScript Object Notation (JSON), and/or another appropriate language. The computing device 900 may provide the content in one or more forms including, but not limited to, forms that are perceptible to the user audibly, visually, and/or through other senses. The handling of requests and responses, as well as the delivery of content, in an embodiment, is handled by the computing device 900 using PHP, Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 900 typically will include an operating system that provides executable program instructions for the general administration and operation of the computing device 900 and includes a computer-readable storage medium (e.g., a hard disk, random access memory (RAM), read only memory (ROM), etc.) storing instructions that if executed (e.g., as a result of being executed) by a processor of the computing device 900 cause or otherwise allow the computing device 900 to perform its intended functions (e.g., the functions are performed as a result of one or more processors of the computing device 900 executing instructions stored on a computer-readable storage medium).

In an embodiment, the computing device 900 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 900 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 900 is capable of storing, retrieving, and accessing structured or unstructured data. In an embodiment, computing device 900 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
generating, based at least in part on output from a machine learning algorithm trained to categorize interfaces, integration code usable to cause a computing device accessing an interface to determine which category from a plurality of categories corresponds to the interface of an interface provider; and
causing, by providing the integration code to the computing device, the computing device to execute the integration code to cause the computing device to:
evaluate characteristics of an interface of an interface provider;
determine a category of an interface of the interface provider, the category being indicative of an operation, specific to the category, that is to be performed in accordance with the interface; and
perform the operation in connection with the interface in a manner that accords with the category.

2. The computer-implemented method of claim 1, further comprising retraining the machine learning algorithm in response to an indication from the computing device that the category determined is incorrect.

3. The computer-implemented method of claim 1, further comprising:
receiving, from the computing device, a request for additional integration code corresponding to an additional interface provider;
generating, based on an additional machine learning algorithm trained to categorize interfaces of the additional interface provider, the additional integration code; and
causing, by providing the additional integration code to the computing device, the computing device to execute the additional integration code.

4. The computer-implemented method of claim 1, further comprising training the machine learning algorithm by at least:
obtaining a plurality of interfaces of an interface provider, each of the plurality of interfaces associated with one of a plurality of interface categories; and
for an individual interface of the plurality of interfaces:
extracting a set of characteristic values from an object model of the individual interface; and
training the machine learning algorithm to categorize interfaces using:
the set of characteristic values; and
an interface category of the individual interface as a ground truth value.

5. The computer-implemented method of claim 4, wherein a member of the set of characteristic values is a depth of a document object model tree of the individual interface.

6. The computer-implemented method of claim 4, wherein a member of the set of characteristic values is a size of an image in the individual interface.

7. The computer-implemented method of claim 6, wherein the size is based on dimensions of a largest image by area in the individual interface.

8. A system, comprising:
one or more processors; and
memory that stores computer-executable instructions that, if executed, cause the one or more processors to:
generate, based at least in part on output from a machine learning algorithm trained to categorize interfaces, integration code usable to cause a client device to determine which category from a plurality of categories corresponds to an interface of an interface provider, the machine learning algorithm trained based at least in part on a set of characteristic values extracted from an object model of an individual interface; and
cause, by providing the integration code to the client device, the client device to execute the integration code to cause the client device to:
evaluate characteristics of an interface of an interface provider;
determine a category of an interface of the interface provider; and
interact with the interface in a manner that accords with the category.

9. The system of claim 8, wherein the computer-executable instructions further include instructions that further cause the system to train the machine learning algorithm to categorize interfaces by causing the system to:
generate a set of vectors based on a set of characteristic values of a plurality of interfaces; and
determine, based at least in part on the set of vectors, a centroid vector usable by the machine learning algorithm to determine the category of the interface.

10. The system of claim 8, wherein the integration code that causes the client device to interact with the interface further includes code that further causes the client device to store a Uniform Resource Identifier of the interface in persistent storage.

11. The system of claim 8, wherein the characteristics include a position of an image in the interface.

12. The system of claim 8, wherein the machine learning algorithm utilizes k-means clustering of a set of characteristic vectors derived from a plurality of interfaces to categorize the interfaces.

13. The system of claim 8, wherein the integration code that causes the client device to interact with the interface further includes code that further causes the client device to indicate on a screen of the client device that operations associated with the category of the interface are available to a user of the client device.

14. The system of claim 8, wherein the computer-executable instructions that cause the system to generate the integration code to the client device further include instructions that further cause the system to insert a set of parameters corresponding to the interface provider into portions of a template script to generate the integration code.

15. The system of claim 8, wherein the computer-executable instructions that cause the system to train the machine learning algorithm further include instructions that further cause the system to:
transform sets of characteristics of a plurality of interfaces into sets of vectors clustered according to their respective interface types; and
determine, based on the sets of vectors, centroids usable to categorize the interfaces, the centroids respectively corresponding to categories of the plurality of interfaces.

16. A non-transitory computer-readable storage medium storing thereon executable instructions that, as a result of being executed by one or more processors of a computer system, cause the computer system to at least:
generate, based at least in part on output from a machine learning algorithm trained to categorize interfaces, integration code usable to cause a computing device to determine which category from a plurality of categories corresponds to an interface of an interface provider; and cause, by providing the integration code to the computing device, the computing device to execute the integration code to cause the computing device to:

evaluate characteristics of an interface of an interface provider;

determine a category of an interface of the interface provider, the category corresponding to an interface type; and perform an operation specific to the category of the interface in a manner that accords with the interface type.

17. The non-transitory computer-readable storage medium of claim 16, wherein the integration code is scripted in JavaScript.

18. The non-transitory computer-readable storage medium of claim 16, wherein the integration code that causes the computing device to interact with the interface further includes code that further causes the computing device to prompt a user for confirmation to perform an action associated with the category.

19. The non-transitory computer-readable storage medium of claim 16, wherein the executable instructions that cause the computer system to generate the integration code further include instructions that further cause the computer system to generate the integration code to cause, upon execution of the integration code by the computing device, the computing device to:

transform the characteristics of the interface into a vector; and identify that the vector is proximate to a centroid vector associated with the category.

20. The non-transitory computer-readable storage medium of claim 19, wherein:

the integration code includes a first centroid vector and a second centroid vector, the first centroid vector being associated with the category; and the integration code that causes the computing device to identify that the vector is proximate to the centroid vector further causes the computing device to determine that the vector is closer in distance to the first centroid vector than to the second centroid vector.

* * * * *